(12) United States Patent
Miyamoto et al.

(10) Patent No.: US 8,040,764 B2
(45) Date of Patent: Oct. 18, 2011

(54) OPTICAL DISC APPARATUS AND CORRECTION SERVO CONTROL SIGNAL GENERATION METHOD

(75) Inventors: Hirotaka Miyamoto, Kanagawa (JP); Kimihiro Saito, Saitama (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 12/472,667

(22) Filed: May 27, 2009

(65) Prior Publication Data

US 2009/0296542 A1    Dec. 3, 2009

(30) Foreign Application Priority Data

May 30, 2008    (JP) .................................. 2008-143351

(51) Int. Cl.
G11B 7/00    (2006.01)
(52) U.S. Cl. .................................................... 369/44.26
(58) Field of Classification Search .................... None
See application file for complete search history.

(56) References Cited

U.S. PATENT DOCUMENTS

| | | | | |
|---|---|---|---|---|
| 4,748,610 | A * | 5/1988 | Nakata et al. ............... | 369/44.25 |
| 5,933,397 | A * | 8/1999 | Yamashita et al. .......... | 369/44.28 |
| 6,101,157 | A * | 8/2000 | Bradshaw et al. .......... | 369/44.35 |
| 6,963,520 | B1 * | 11/2005 | Park et al. .................. | 369/44.11 |
| 2003/0174595 | A1 * | 9/2003 | Wilkinson et al. ......... | 369/44.13 |
| 2005/0195707 | A1 * | 9/2005 | Park et al. .................. | 369/44.26 |
| 2006/0114794 | A1 * | 6/2006 | Suzuki et al. ............. | 369/112.01 |
| 2009/0262633 | A1 | 10/2009 | Saito et al. | |

FOREIGN PATENT DOCUMENTS

| | | | |
|---|---|---|---|
| JP | 58-041447 | A | 3/1983 |
| JP | 60-170035 | A | 9/1985 |
| JP | 60-258739 | A | 12/1985 |
| JP | 62-167628 | A | 7/1987 |
| JP | 03248342 | A * | 11/1991 |
| JP | 07-021565 | A | 1/1995 |
| JP | 2001-067714 | A | 3/2001 |
| JP | 2003-315988 | A | 11/2003 |
| JP | 2005-235282 | A | 9/2005 |
| JP | 2006-114168 | A | 4/2006 |
| JP | 2008-071433 | A | 3/2008 |

* cited by examiner

*Primary Examiner* — Will J Klimowicz
*Assistant Examiner* — Mark Fischer
(74) *Attorney, Agent, or Firm* — Wolf, Greenfield & Sacks, P.C.

(57) ABSTRACT

An optical disc apparatus includes an objective lens that converges a light beam emitted from a light source and irradiates an optical disc having recording marks formed in a uniform recording layer with it, a detection signal generation section that receives a return light beam from the recording mark and generates a detection signal, a servo control signal generation section that generates a servo control signal representing relative displacement between the recording mark and a focus of the light beam from the detection signal and a servo signal correction section that generates a correction servo control signal by connecting peaks or neighborhoods of the peaks of servo control signals, the peaks being produced according to the recording marks.

11 Claims, 18 Drawing Sheets

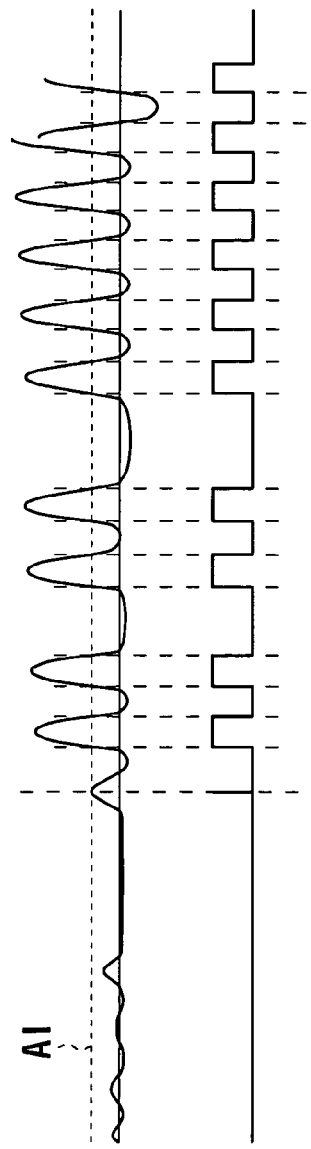
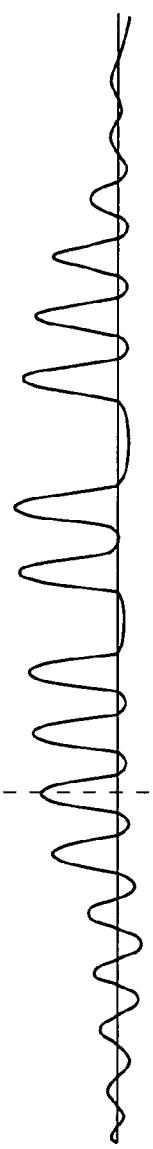
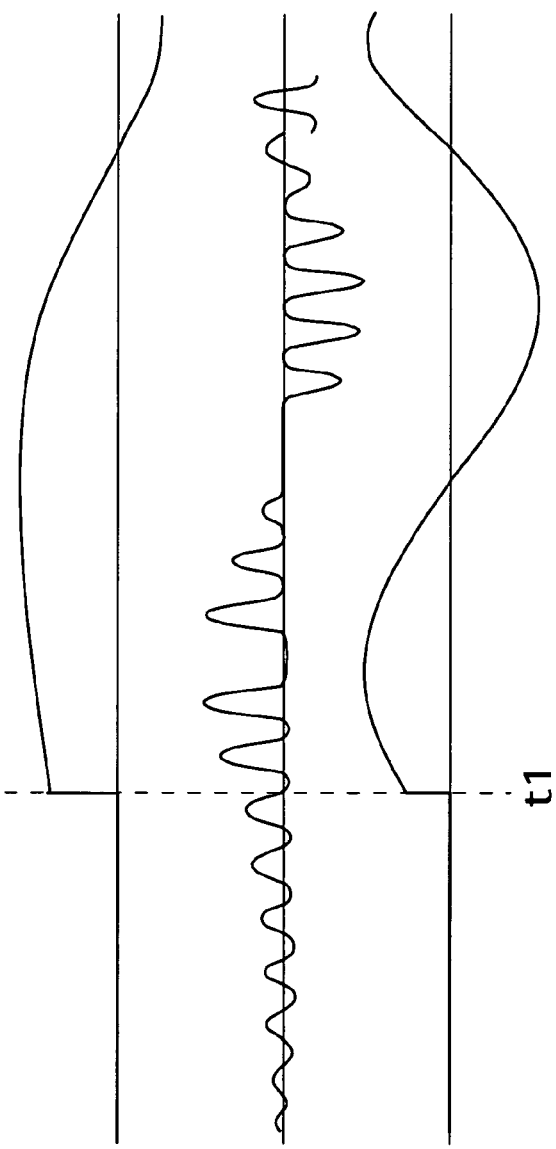
FIG.12A  SPI:PULL-IN SIGNAL
FIG.12B  SPR:PEAK DETECTION SIGNAL
FIG.12C  SFEm:FOCUS ERROR SIGNAL
FIG.12D  SFEh:CORRECTED FOCUS ERROR SIGNAL
FIG.12E  STEm:TRACKING ERROR SIGNAL
FIG.12F  STEh:CORRECTED TRACKING ERROR SIGNAL

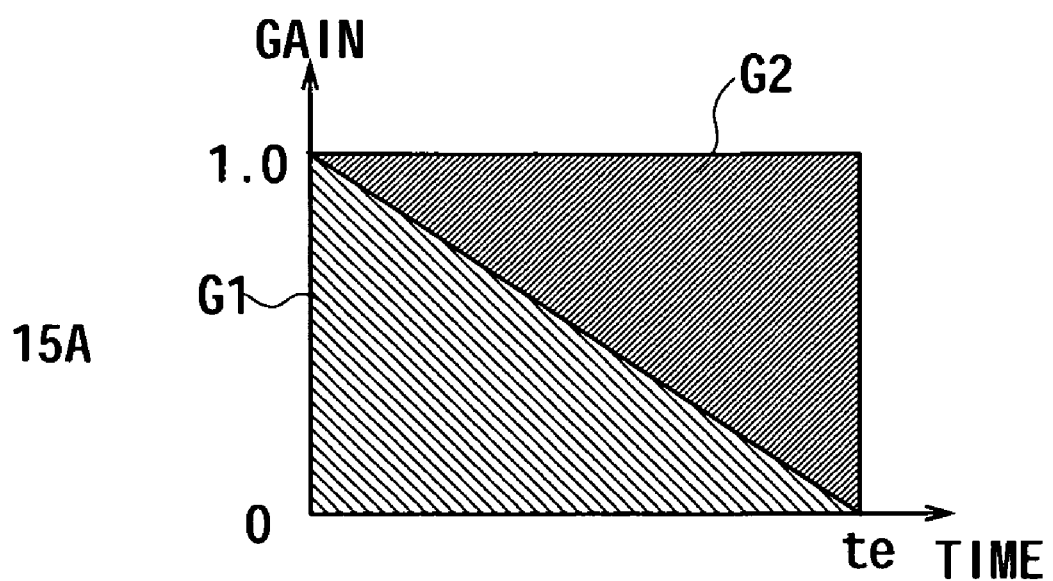
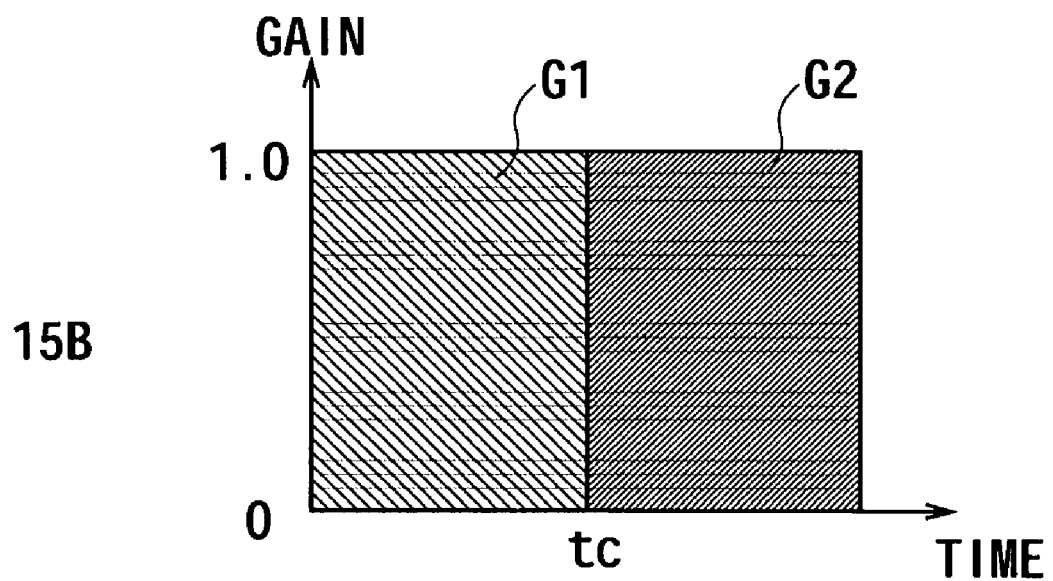
FIG. 15

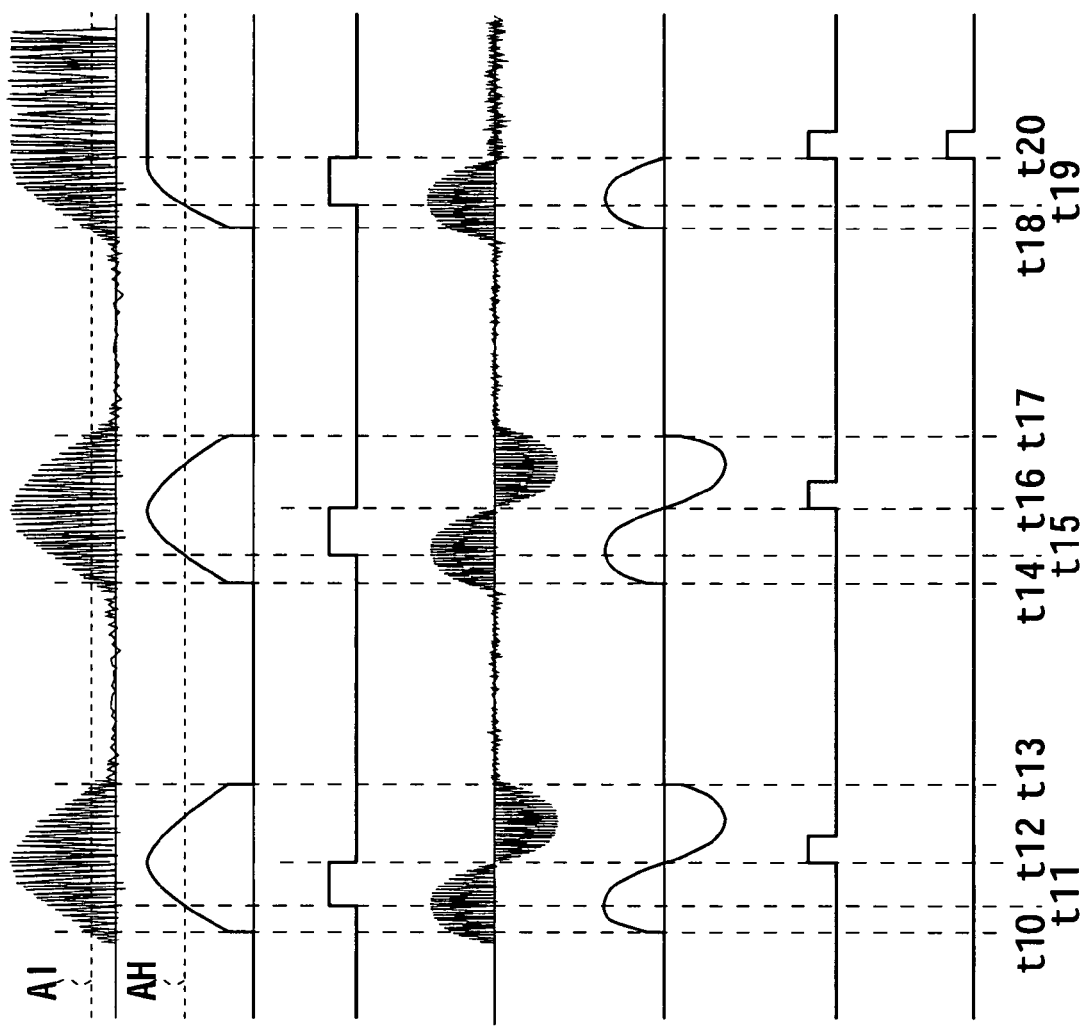

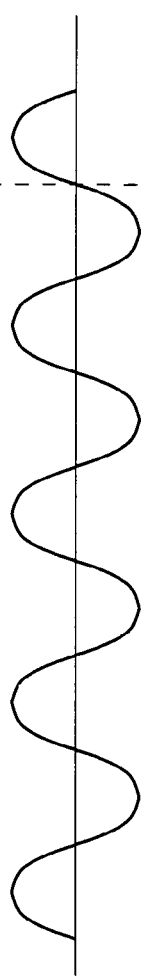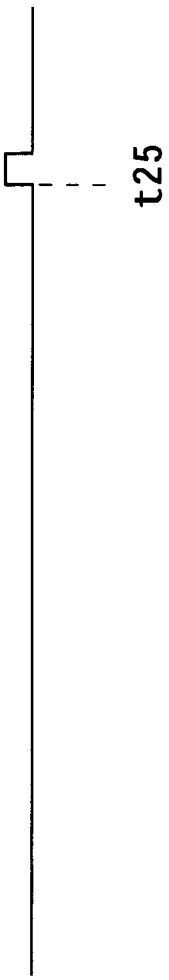
FIG.18A SPI:PULL-IN SIGNAL
FIG.18B STEm:TRACKING ERROR SIGNAL
FIG.18C STEh:CORRECTED TRACKING ERROR SIGNAL
FIG.18D STL:TRACKING LOOP CONTROL SIGNAL

OPTICAL DISC APPARATUS AND CORRECTION SERVO CONTROL SIGNAL GENERATION METHOD

BACKGROUND OF THE INVENTION

1. Field of the Invention

The present invention relates to an optical disc apparatus and a correction servo control signal generation method that can be suitably applied to optical disc apparatus designed to reproduce information from an optical disc having a uniform recording layer where recording marks are formed.

2. Description of the Related Art

Optical discs of the known types such as compact discs (CD), digital versatile discs (DVD) and Blu-ray discs (registered trademark, to be referred to as BD hereinafter) have become very popular. Optical disc apparatus for playing such optical discs are designed to irradiate a desired track to be irradiated with a light beam of the signal recording layer with the light beam and read reflected light coming from the optical disc.

As a light beam is applied onto the signal recording layer of an optical disc by means of such a known type optical disc apparatus, the light beam is reflected by the signal recording layer so that the optical disc apparatus can receive reflected light with not less than a predetermined level of intensity at all times. Therefore, known type optical disc apparatus are designed to perform servo control of generating various error signals (e.g., focus error signal and tracking error signal) that represent the quantity of displacement of the light beam from the desired track according to the received reflected light so as to irradiate a desired position with a light beam.

Additionally, known type optical disc apparatus are designed to record information on an optical disc by applying a light beam onto the signal recording layer of the optical disc so as to modify the local reflectance of the signal recording layer.

It is known that the size of the beam spot that is formed when the light beam emitted from an optical disc apparatus is converged by an objective lens is defined by $\lambda/NA$ ($\lambda$: wavelength of light beam, NA: numerical aperture) and the resolution is proportional to this value. For example, in the case of a BD system, data of about 25 GB can be recorded per layer of an optical disc with a diameter of 120 mm.

Various pieces of information that can be recorded on optical discs include contents such as music contents and video contents and data including those to be used for computers. Particularly, the quantity of information to be recorded on an optical disc has increased due to the availability of high definition images and high sound quality pieces of music and an increased number of contents are required to be recorded on a single optical disc. Thus, there is a demand for optical discs having a larger capacity.

Under these circumstances, techniques have been proposed for simplifying the operation required to record information on and increasing the capacity of an optical disc by recording a standing wave in a uniform recording layer as recording mark typically by means of hologram (refer to, e.g., Jpn. Pat. Appln. Laid-Open Publication No. 2008-071433).

An optical disc apparatus realized by utilizing the technique of the above Patent Document applies a light beam onto an irradiation line that connects the centers of recording marks of an optical disc and receives reflected light coming from the optical disc. Then, the optical disc apparatus detects the presence or absence of a recording mark with the reflected light to reproduce information.

SUMMARY OF THE INVENTION

However, an optical disc to be played by an optical disc apparatus having the above-described arrangement does not have any signal recording layer that is not uniform. Therefore, when such an optical disc apparatus applies a light beam onto such an optical disc, it is not possible to obtain reflected light with not less than a predetermined level of intensity at all times. Then, there arises a problem that it is not possible to generate a servo control signal that represents the displacement from the light beam irradiation line.

In view of the above-identified problem, the present invention proposes an optical disc apparatus and a correction servo control signal generation method that can generate a correction servo control signal representing the displacement from a light beam irradiation line.

The present invention is made to solve the aforementioned problem and provides an optical disc apparatus including: an objective lens that converges a light beam emitted from a light source and irradiates an optical disc having recording marks formed in a uniform recording layer with the beam; a detection signal generation section that receives a return light beam from the recording mark and generates a detection signal; a servo control signal generation section that generates a servo control signal representing relative displacement between the recording mark and a focus of light from the detection signal; and a servo signal correction section that generates a correction servo control signal by connecting peaks or neighborhoods of the peaks of servo control signals, the peaks being produced according to the recording marks.

With this arrangement, it is possible to eliminate fluctuations in the quantity of the return light beam from the servo control signal.

In another aspect of the present invention, there is provided a correction servo control signal generation method including: a servo control signal generation step of generating a servo control signal representing relative displacement between a recording mark and a focus of a light beam from a detection signal produced according to the quantity of a return light beam from an optical disc having recording marks formed in a uniform recording layer; and a servo signal correction step of generating a correction servo control signal by connecting peaks or neighborhoods of the peaks of servo control signals produced according to the recording marks.

With this arrangement, the correction servo control signal generation method can eliminate fluctuations in the quantity of the return light beam from the servo control signal.

Thus, according to the present invention, it is possible to eliminate fluctuations in the quantity of the return light beam from the servo control signal. Then, it is possible to realize an optical disc apparatus and a correction servo control signal generation method that can generate a correction servo control signal representing the displacement of the light beam from the irradiation line.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 12A through 12F are a schematic illustration of a switch of the gain of detection signal in focus control;

FIG. 15 is a schematic illustration of a corrected focus error signal;

FIGS. 17A through 17G are a schematic illustration of pulling in the focus of the second embodiment; and FIGS. 18A through 18D are a schematic illustration of pulling in the tracking of the second embodiment.

DETAILED DESCRIPTION OF THE PREFERRED EMBODIMENTS

Now, preferred embodiments of the present invention will be described in greater detail by referring to the accompanying drawings.

(1) First Embodiment (1-1) Theoretical Principle of Operation of Recording Information on and that of Reproducing Information from Optical Disc Firstly, the theoretical principle of recording information on and reproducing information from an optical disc of the first embodiment will be described below. In the first embodiment, recording marks RM that are bubbles are formed in the recording layer 101 of an optical disc 100.

Figure 1:
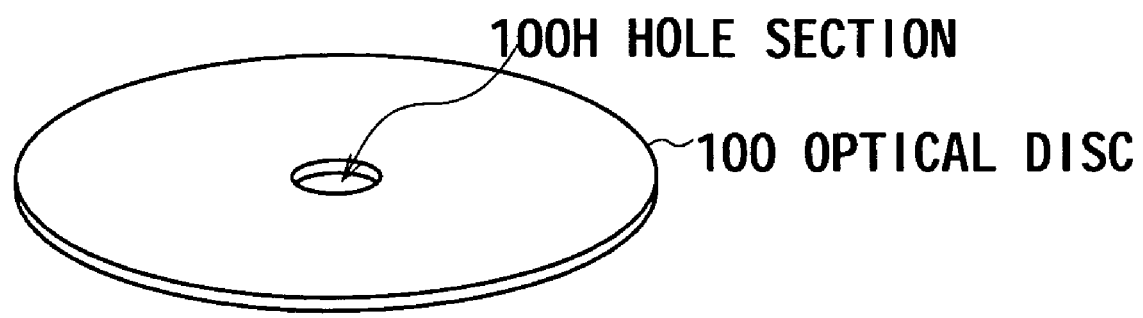
FIG. 1 is a schematic perspective view of an optical disc, illustrating the appearance thereof.

Referring to FIG. 1, which illustrates the appearance of the optical disc 100, the optical disc 100 has a substantially disk-shaped profile and a catching hole 100H is formed at the center thereof.

Figure 2:
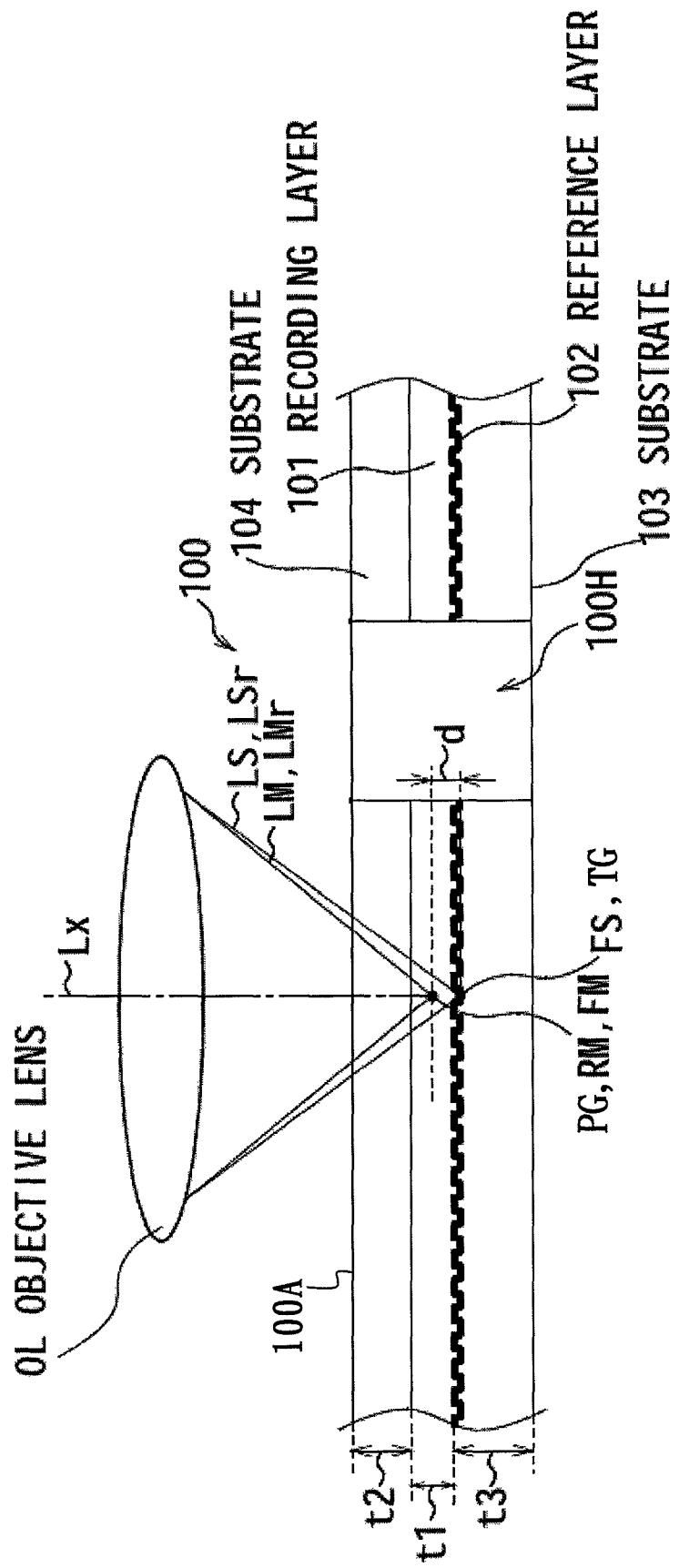
FIG. 2 is a schematic illustration of the internal arrangement of an optical disc.

FIG. 2 is a schematic cross sectional view of the optical disc 100. As shown in FIG. 2, the optical disc 100 is formed by arranging a pair of substrate 103 and 104 at the opposite sides of a recording layer 101 for recording information and a reference layer 102 is arranged between the recording layer 101 and the substrate 103.

The reference layer 102 has guide grooves for servo. More specifically, spiral tracks (to be referred to as reference tracks hereinafter) are formed by lands and grooves as in the case of ordinary Blu-ray discs-recordable (BD-R).

Addresses that are serial numbers are assigned to predetermined recording units of the reference tracks. When recording or reproducing information, the reference track to be irradiated with a servo light beam LS (to be referred to as target reference track hereinafter) can be identified by the address assigned to it.

The guide grooves of the reference layer 102 (at the boundary of the recording layer 101 and the substrate 103) may be replaced by pits or a combination of guide grooves and pits. The tracks of the reference layer 102 may be concentrically circular tracks instead of spiral tracks.

The reference layer 102 is typically adapted to reflect a blue light beam of a wavelength of about 405 nm and a red light beam of a wavelength of about 660 nm with a high reflectance.

Optical disc apparatus 20 irradiates the optical disc 100 with a servo light beam LS of a wavelength of about 660 nm. The servo light beam LS is reflected by the reference layer 102 of the optical disc 100 to become reflected servo light beam LSr.

The optical disc apparatus 20 receives the reflected servo light beam LSr and focuses the servo light beam LS on the reference layer 102 by position-controlling the objective lens 40, driving it to come close to or move away from the optical disc 100 according to the outcome of the reception of the reflected servo light beam LSr.

On the other hand, the recording layer 101 is typically made of photopolymer that reacts to a blue light beam of a wavelength of 405 nm to form a bubble therein according to the information light beam LM with a predetermined light intensity or above.

At this time, the optical disc apparatus 20 makes the optical axis of the servo light beam LS and that of the information light beam LM agree with each other. As a result, the optical disc apparatus 20 places the focus FS of the information light beam LM to a position that corresponds to the target reference track in the recording layer 101 that is a position on a normal of, or a line perpendicular relative to, the reference layer 102 that passes through the target reference track.

In the following description, the track of a target mark layer YG that corresponds to the target reference track is referred to as target track TG and the position of the focus FM is referred to as target position PG. Thus, the target position PG is located on the irradiation line that connects the centers of recording marks RM.

A recording mark RM is recorded as a bubble at the position of the focus FM when an information light beam LM having a relatively high level of intensity is applied into the recording layer 101.

Note that the optical disc apparatus 20 encodes the information to be recorded into binary recording data that is a combination of codes "0s" and "1s". Additionally, the optical disc apparatus 20 controls the emission of the information light beam LM so as to form a recording mark RM for a code "0" and not to form any recording mark RM for a code "1".

Still additionally, the optical disc apparatus 20 drives the optical disc 100 to rotate and modulates the intensity of the information light beam LM, while controlling the objective lens 40 so as to move, if necessary, it in a radial direction.

Then, as a result, a plurality of recording marks RM are sequentially formed in the recording layer 101 of the optical disc 100 so as to make the spiral tracks of the plurality of recording marks RM correspond to the tracks arranged in the reference layer 102.

The recording marks RM that are formed in this way are arranged on a plane that is substantially parallel to the various levels of the optical disc 100 including the level of the first surface 100A and that of the reference layer 102 so as to produce a layer of recording marks RM (to be referred to as mark layer Y hereinafter).

Additionally, the optical disc apparatus 20 can form a plurality of mark layers Y in the recording layer 101 by shifting the position of the focus FM of the information light beam LM in the direction of thickness of the optical disc 100. For example, the optical disc apparatus 20 typically sequentially forms mark layers from the first surface 100A of the optical disc 100 at predetermined regular intervals.

On the other hand, when the optical disc apparatus 20 reproduces information from the optical disc 100, it converges the information light beam LM typically from the side of the first surface 100A. If a recording mark RM is formed at the position of the focus FM (and hence at the target position PG), the information light beam LM is reflected by the recording mark RM so that a reflected information light beam LMr is emitted from the recording mark RM.

Then, the optical disc apparatus 20 generates a detection signal that corresponds to the outcome of detection of the reflected information light beam LMr and detects if a recording mark RM is formed there or not according to the detection signal.

Thus, the optical disc apparatus 20 can reproduce the recorded information by assigning code "1" when a recording mark RM is formed and code "0" when no recording mark RM is formed.

In this way, when reproducing information from the optical disc 100, the optical disc apparatus 20 of the first embodiment reproduces the desired information by irradiating the information light beam LM to the target position PG, using a servo light beam LS in combination.

(1-2) Configuration of Optical Disc Apparatus

Figure 3:
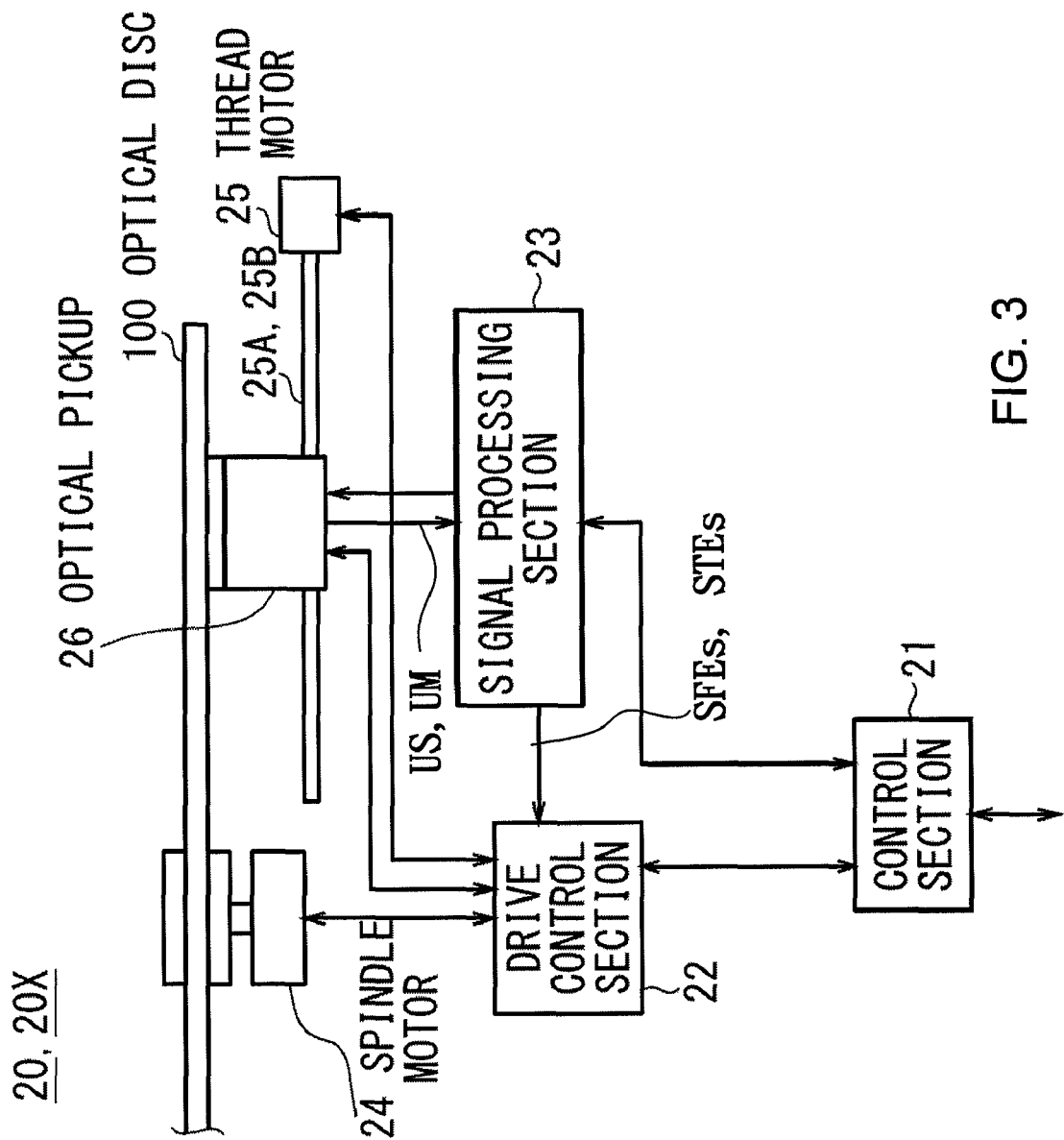
FIG. 3 is a schematic block diagram of an optical disc apparatus, illustrating the configuration thereof.

As shown in FIG. 3, the optical disc apparatus 20 is formed around a control section 21 that operates as its core. Although not shown, the control section 21 is by turn formed by a central processing unit (CPU), a read only memory (ROM) that stores various programs and a random access memory (RAM) that operates as working memory of the CPU.

When reproducing information from an optical disc 100, the control section 21 drives a spindle motor 24 to rotate by way of a drive control section 22 so as to drive the optical disc 100 mounted on a predetermined turn table to rotate at a desired rotational speed.

Additionally, the control section 21 drives thread motor 25 by way of the drive control section 22 so as to move an optical pickup 26 in one of the tracking directions, or either in a direction toward the outer periphery of the optical disc 100 or in a direction toward the inner periphery of the optical disc 100, along the axes of movement 25A and 25B to a large extent.

A plurality of optical parts such as an objective lens 40 are fitted to the optical pickup 26 so as to apply a servo light beam LS and an information light beam LM toward the optical disc 100 under the control of the control section 21 to detect a reflected servo light beam LSr and a reflected information light beam LMr.

Signal processing section 23 reproduces the information recorded as recording mark RM on the target track TG of the target mark layer YG by executing a predetermined arithmetic process, a predetermined demodulation process and a predetermined decoding process on the detection signal.

Biaxial actuator 40A of the optical pickup 26 controls the objective lens 40 for focus control and tracking control according to a corrected focus error signal SFEh and a corrected tracking error signal STEh that are computationally determined from the detection signal and adjusts the position of the focus FS of the servo light beam LS and that of the focus FM of the information light beam LM that are converged by the objective lens 40 (as will be described in greater detail hereinafter).

(1-3) Configuration of Optical Pickup

Figure 4:
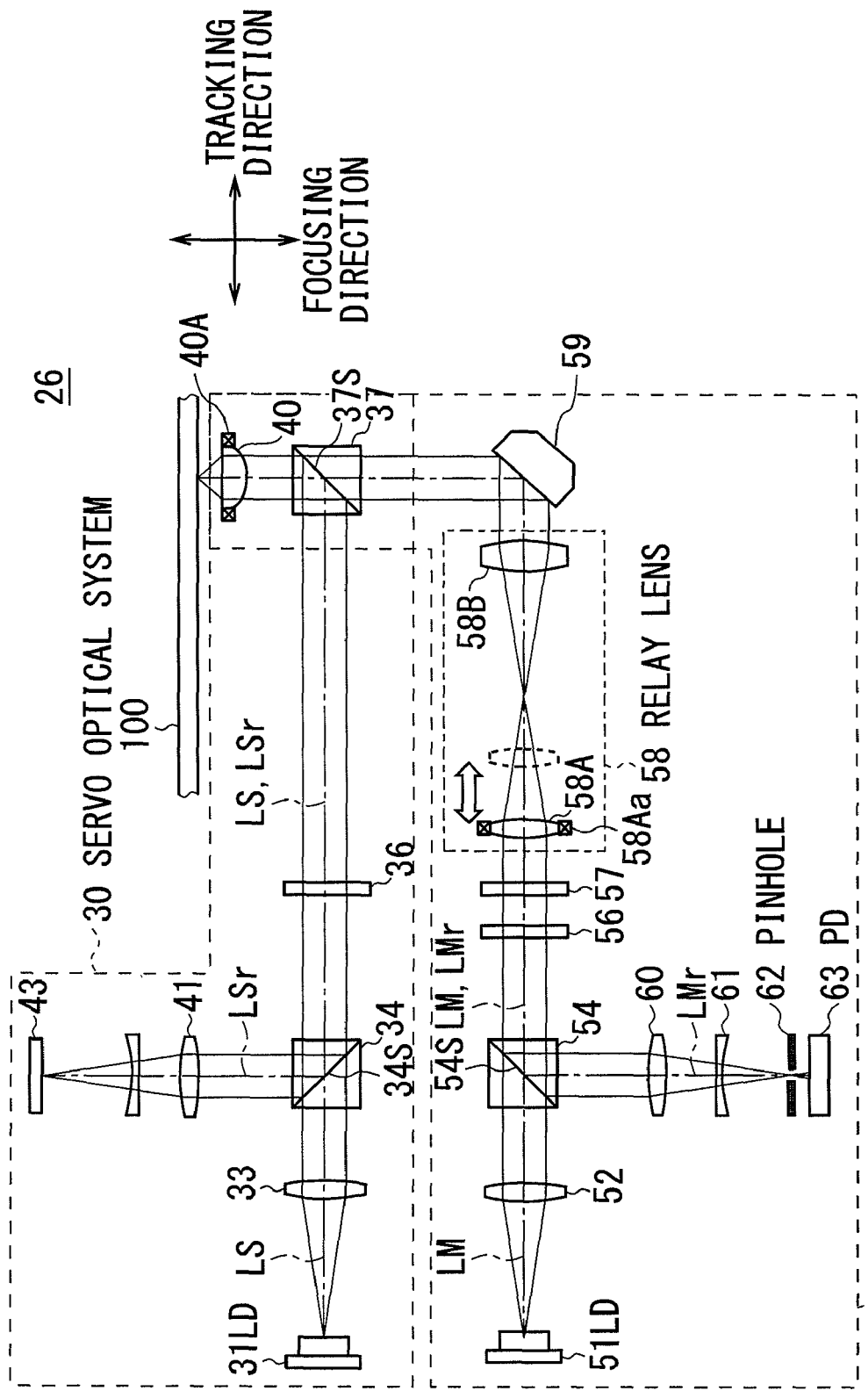
FIG. 4 is a schematic block diagram of the optical pickup according to the first embodiment of the present invention, illustrating the configuration thereof.

Now, the configuration of the optical pickup 26 will be described below. The optical pickup 26 has a servo optical system 30 for servo control and an information optical system 50 for reproducing or recording information as shown in FIG. 4.

(1-3-1) Light Path of Servo Light Beam

Figure 5:
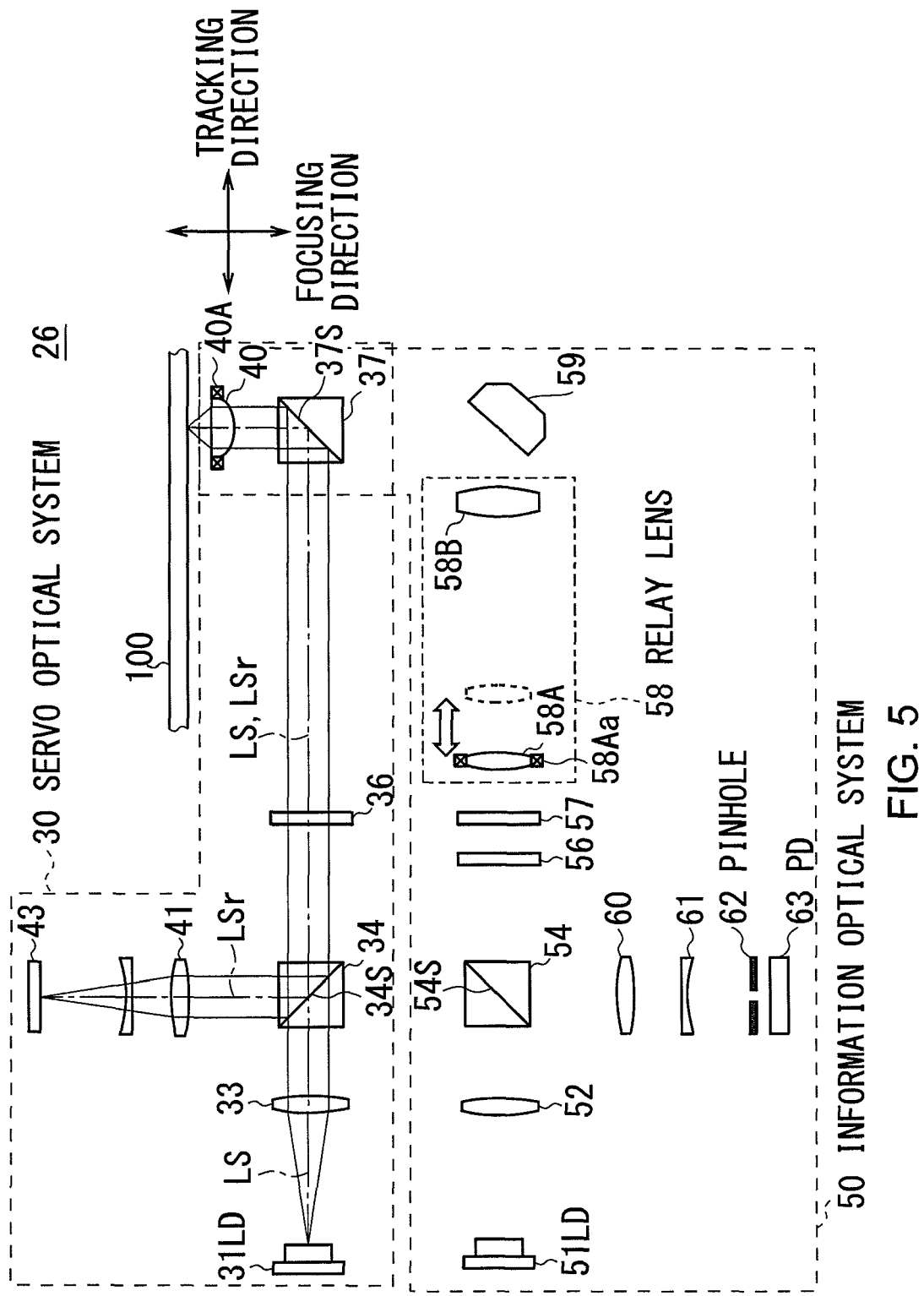
FIG. 5 is a schematic block diagram of the optical pickup, illustrating the light path of the servo light beam.

As shown in FIG. 5, the servo optical system 30 irradiates the optical disc 100 with a servo light beam LS of a wavelength of about 660 nm by way of the objective lens 40 and receives a reflected servo light beam LSr produced as the servo light beam LS is reflected by the optical disc 100.

More specifically, a laser diode 31 emits a servo light beam LS that is a divergent light beam of a predetermined quantity of light under the control of the control section 21 (FIG. 3) and makes it enter a collimator lens 33. The collimator lens 33 converts the servo light beam LS from a divergent light beam into a collimated light beam and makes it enter a polarization beam splitter 34.

The polarization beam splitter 34 transmits substantially all the servo light beam LS that is a P-polarized light beam through the reflection/transmission plane 34S thereof according to the direction of polarization of the light beam and makes it enter a ¼ wave plate 36.

The ¼ wave plate 36 converts the servo light beam LS into a circularly polarized light beam and makes it enter a dichroic prism 37. The dichroic prism 37 reflects the servo light beam LS by the reflection/transmission plane 37S thereof according to the wavelength of the light beam and makes it enter the objective lens 40.

The objective lens 40 converges the servo light beam LS and irradiates the reference layer 102 of the optical disc 100 with it. At this time, as shown in FIG. 2, the servo light beam LS is transmitted through the substrate 104 and reflected by the reference layer 102 to become a reflected servo light beam LSr that is directed in the direction opposite to the traveling direction of the servo light beam LS.

Subsequently, the reflected servo light beam LSr is converted into a collimated light beam by the objective lens 40 and made to enter the dichroic prism 37. The dichroic prism 37 reflects the reflected servo light beam LSr and makes it enter the ¼ wave plate 36.

The ¼ wave plate 36 converts the reflected servo light beam LSr that is a circularly polarized light beam into an S-polarized light beam and makes it enter the polarization beam splitter 34. The polarization beam splitter 34 reflects the reflected servo light beam LSr that is an S-polarized light beam according to the direction of polarization of the light beam and makes it enter a condenser lens 41.

The condenser lens 41 converges the reflected servo light beam LSr and, after providing it with astigmatism, irradiates a photodetector 43 with the reflected servo light beam LSr.

Meanwhile, the surface of the rotating optical disc 100 may give rise to surface run-off. Then, the position of the target reference track can be shifted relative to the objective lens 40 of the optical disc apparatus 20.

For this reason, in order for the focus FS (FIG. 2) of the servo light beam LS to follow the target track, the focus FS needs to be moved in one of the focusing directions, or either in a direction of coming close to the optical disc 100 or in a direction of moving away from the optical disc 100, and also in one of the tracking directions, or either in a direction toward the outer periphery of the optical disc 100 or in a direction toward the inner periphery of the optical disc 100.

Thus, the objective lens 40 can be driven to move in any of the biaxial directions including the focusing directions and the tracking directions by means of the biaxial actuator 40A.

Additionally, in the servo optical system 30 (FIG. 4), the optical positions of the various optical parts are adjusted such that the in-focus state of the servo light beam LS when it is converged by the objective lens 40 and applied onto the reference layer 102 of the optical disc 100 is reflected to the in-focus state of the reflected servo light beam LSr when it is converged by the condenser lens 41 and applied onto the photodetector 43.

Figure 6:
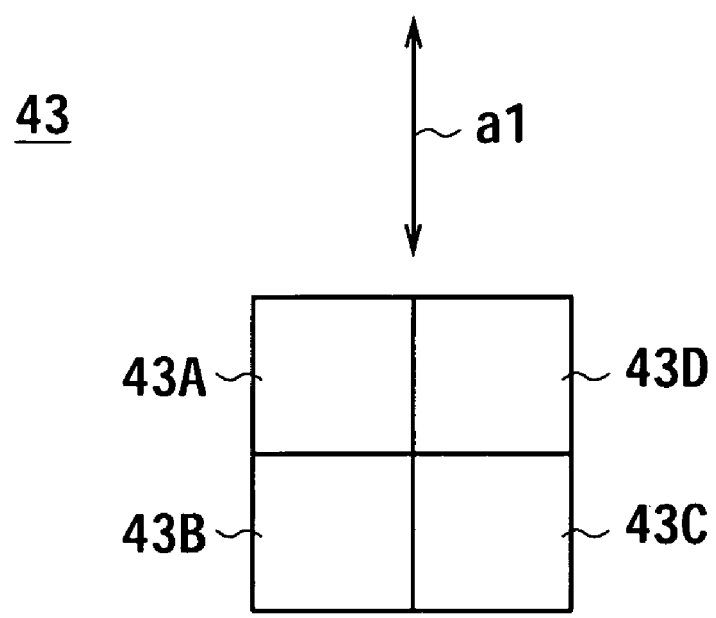
FIG. 6 is a schematic illustration of the detection regions of a photodetector, illustrating arrangement (1) thereof.

As shown in FIG. 6, the photodetector 43 has four detection regions 43A, 43B, 43C and 43D that are produced by dividing the surface thereof that is to be irradiated with a reflected servo light beam LSr by a lattice. Note that the directions indicated by arrow a1 (the vertical direction in FIG. 6) corresponds to the running directions of the tracks when a servo light beam LS is applied onto the reference layer 102 (FIG. 2).

The photodetector 43 detects parts of the reflected servo light beam LSr respectively by means of the detection regions 43A, 43B, 43C and 43D and generates servo detection signals USa, USb, USc and USd that represent the detected quantities of light (to be referred collectively as servo detection signals US hereinafter), which servo detection signals are then sent out to the signal processing section 23 (FIG. 3).

In this way, the servo optical system 30 irradiates the reference layer 102 of the optical disc 100 with a servo light beam LS and detects the reflected servo light beam LSr. Then, it generates servo detection signals US and supplies them out to the signal processing section 23.

(1-3-2) Light Path of Information Light Beam

Figure 7:
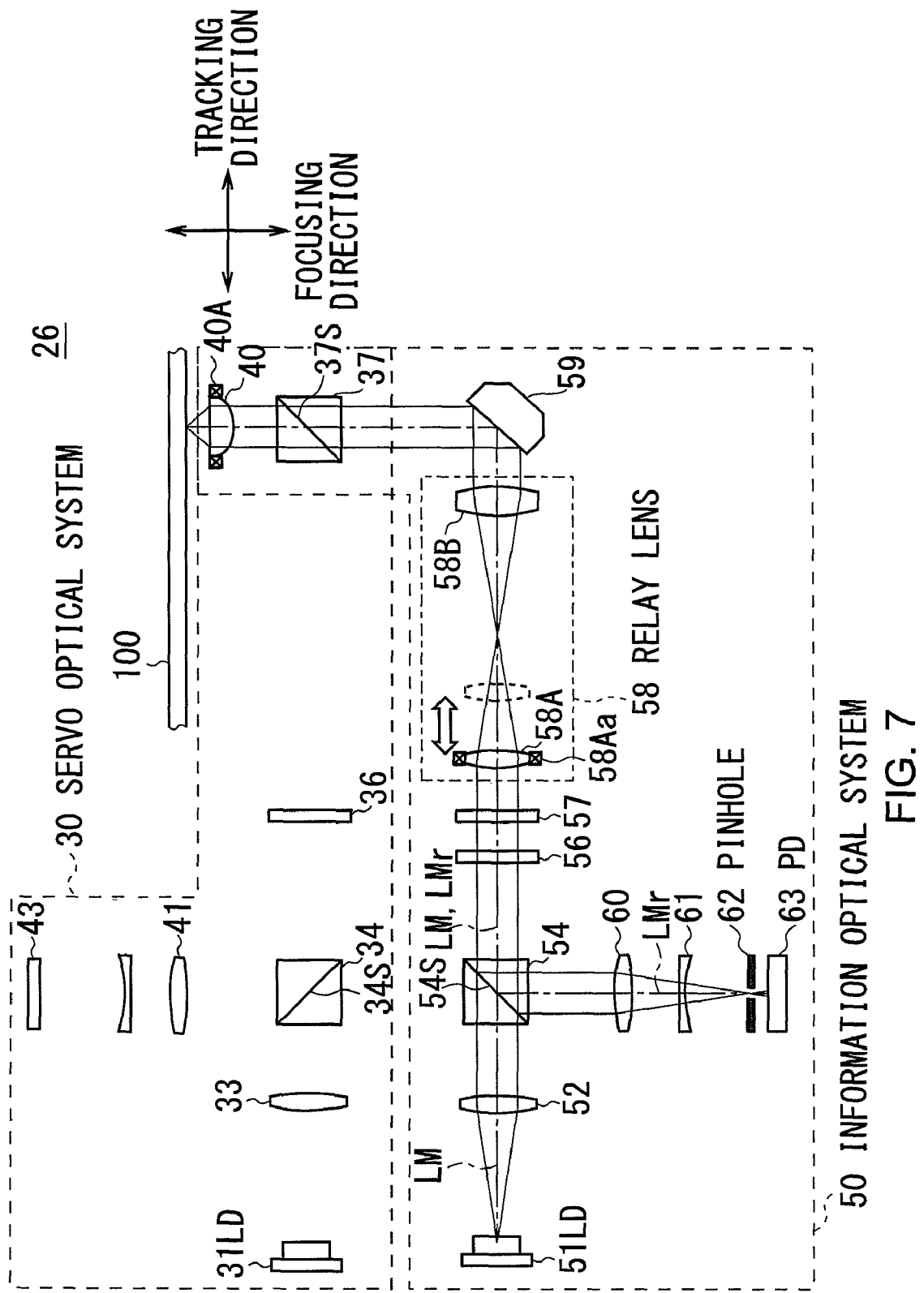
FIG. 7 is a schematic block diagram of the optical disc pickup, illustrating the light path of information light beam.
Figure 8:
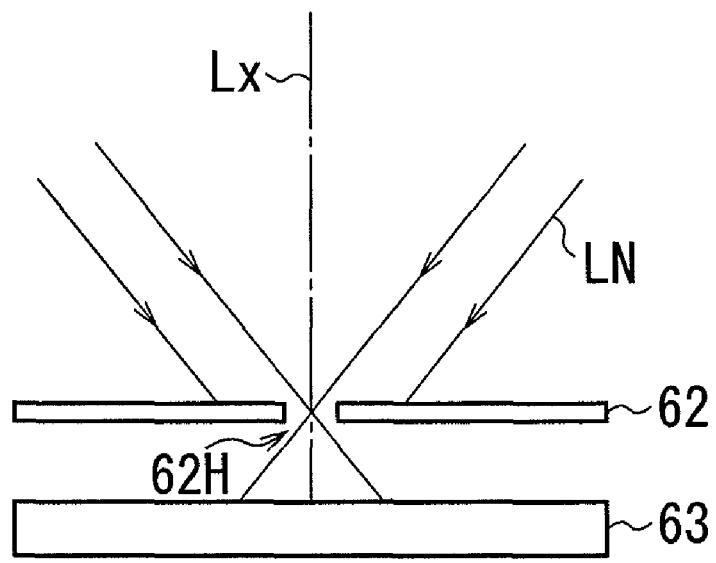
FIG. 8 is a schematic illustration of selection of a light beam by means of a pin hole.

On the other hand, the information optical system 50 irradiates the optical disc 100 with the information light beam LM emitted from a laser diode 51 by way of the objective lens 40 and receives reflected information light beam LMr that is produced as the information light beam LM is reflected by the optical disc 100 by means of a photodetector 63 as shown in FIG. 7 that corresponds to FIG. 4.

The laser diode 51 is adapted to emit a blue laser beam of a wavelength of about 405 nm. More specifically, the laser diode 51 emits a divergent information light beam LM of a predetermined quantity of light under the control of the control section 21 (FIG. 4) and makes it enter a collimator lens 52. The collimator lens 52 converts the information light beam LM from a divergent light beam into a collimated light beam and makes it enter a polarization beam splitter 54.

The polarization beam splitter 54 transmits substantially all the information light beam LM that is a P-polarized light beam through the reflection/transmission plane 54S thereof according to the direction of polarization of the light beam and makes it enter a ¼ wave plate 57 by way of a liquid crystal panel (LCP) 56 for correcting spherical aberration. The ¼ wave plate 57 converts the information light beam LM from a P-polarized light beam into a circularly polarized light beam and makes it enter a relay lens 58.

The relay lens 58 converts the information light beam LM from a collimated light beam into a convergent light beam by means of a movable lens 58A and adjusts the degree of convergence or divergence (to be referred to as state of convergence hereinafter) of the information light beam LM that becomes a divergent light beam after the conversion into a convergent light beam before making it enter a mirror 59.

The movable lens 58A is adapted to be moved in the directions of the optical axis of the information light beam LM by an actuator 58Aa. More specifically, the relay lens 58 can change the state of convergence of the information light beam LM emitted from a fixed lens 58B by driving the movable lens 58A to move by means of the actuator 58Aa under the control of the drive control section 22 (FIG. 2).

The mirror 59 deflects the traveling direction of the information light beam LM by reflecting it and makes it enter the dichroic prism 37. The dichroic prism 37 transmits the information light beam LM through the reflection/transmission plane 37S thereof and makes it enter the objective lens 40.

The objective lens 40 converges the information light beam LM and irradiates the optical disc 100 with it. At this time, the information light beam LM is transmitted through the substrate 104 and focused in the inside of the recording layer 101 as shown in FIG. 2.

The position of the focus FM of the information light beam LM is determined according to its state of convergence that is observed when it is emitted from the fixed lens 58B of the relay lens 58. In other words, the focus FM may be moved in one of the focusing directions in the recording layer 101 according to the position of the movable lens 58A.

More specifically, as the movable lens 58A is controlled by the drive control section 22 (FIG. 3) for its position, the information optical system 50 adjusts the depth d (FIG. 2) of the focus FM of the information light beam LM in the recording layer 101 of the optical disc 100 (and hence the distance from the reference layer 102) so as to make the focus FM agree with the target position PG.

In this way, the information optical system 50 applies information light beam LM by way of the objective lens 40 that is servo-controlled by the servo optical system 30 and makes the focus FM of the information light beam LM agree with the target position PG in terms of the tracking directions thereof. Additionally, it makes the focus FM agree with the target position PG in terms of the focusing directions thereof by adjusting the depth d (FIG. 2) of the focus FM according to the position of the movable lens 58A of the relay lens 58.

Thus, when the optical disc apparatus executes a recording process of recording information on an optical disc 100, the information light beam LM is converged to the focus FM by the objective lens 40 to form a recording mark RM at the position of the focus FM.

On the other hand, when the optical disc apparatus executes a reproduction process of reading out information recorded on an optical disc 100 and if a recording mark RM is recorded at or near the target position PG, the information light beam LM that is converged to the focus FM is reflected by the recording mark RM to become reflected information light beam LMr, which is then made to enter the objective lens 40.

On the other hand, if no recording mark RM is recorded at the position of the focus FM, the information light beam LM that is once converged to the focus FM is diverged again and reflected by the reference layer 102 to become reflected information light beam LMr, which is then made to enter the objective lens 40.

The objective lens 40 converges the reflected information light beam LMr to a certain extent and makes it enter the dichroic prism 37. The dichroic prism 37 transmits the reflected information light beam LMr and makes it enter the mirror 59. The mirror 59 deflects the traveling direction of the reflected information light beam LMr by reflecting it and makes it enter the relay lens 58.

The relay lens 58 converts the reflected information light beam LMr into a collimated light beam and makes it enter the ¼ wave plate 57. The ¼ wave plate 57 converts the reflected information light beam LMr from a circularly polarized light beam into an S-polarized light beam and makes it enter the polarization beam splitter 54 by way of the LCP 56.

The polarization beam splitter 54 reflects the reflected information light beam LMr that is an S-polarized light beam by the polarization plane 54S thereof and makes it enter a condenser lens 60. The condenser lens 60 converges the reflected information light beam LMr and makes it enter a cylindrical lens 61. The cylindrical lens 61 adds astigmatism to the reflected information light beam LMr and irradiates the photodetector 63 with it by way of pinhole plate 62.

Since the pinhole plate 62 is arranged so as to place the focus of the reflected information light beam LMr that is converged by the condenser lens 60 (FIG. 7) in the inside of hole section 62H, the reflected information light beam LMr simply passes through the hole section 62H.

On the other hand, the pinhole plate 62 substantially intercepts all light reflected by the surface of the substrate 102 of the optical disc 100, some of the recording marks RM other than the recording mark RM located at the target position PG and the reference layer 102 (to be referred to as stray light LN hereinafter). Thus, as a result, the photodetector 63 practically does not detect any stray light LN.

As a result, the photodetector 63 generates information detection signals UM that accurately reflect the quantity of light of the reflected information light beam LMr without being affected by stray light LN and supplies it to the signal processing section 23 (FIG. 6).

Figure 9:
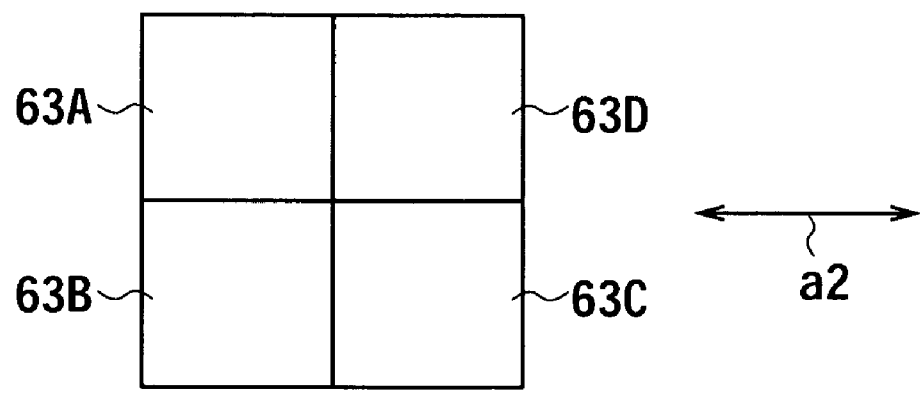
FIG. 9 is a schematic illustration of the detection regions of a photodetector, illustrating arrangement (2) thereof.

As shown in FIG. 9, the photodetector 63 has four detection regions 63A, 63B, 63C and 63D that are produced by dividing the surface thereof that is to be irradiated with a reflected servo light beam LSr by a lattice. Note that the directions indicated by arrow a2 (the vertical direction in FIG. 9) corresponds to the running directions of the tracks when an information light beam LM is applied onto the recording layer 101.

The photodetector 63 detects parts of the reflected information light beam LMr respectively by means of the detection regions 63A, 63B, 63C and 63D and generates information detection signals UM (UMa, UMb, UMc and UMd) that represent the detected quantities of light, which information detection signals UM are then sent out to the signal processing section 23 (FIG. 3).

In this way, the information optical system 50 receives the reflected information light beam LMr that is struck from the optical disc 100 to the recording layer 101. Then, it supplies the outcome of the reception of light to the signal processing section 23.

(1-4) Focus Control and Tracking Control

Now, the focus control and the tracking control of the optical disc apparatus 20 will be described below. The optical disc 100 can be tilted relative to the optical disc apparatus 20 when the optical disc 100 itself gives rise to warp or surface run-off.

Figure 10:
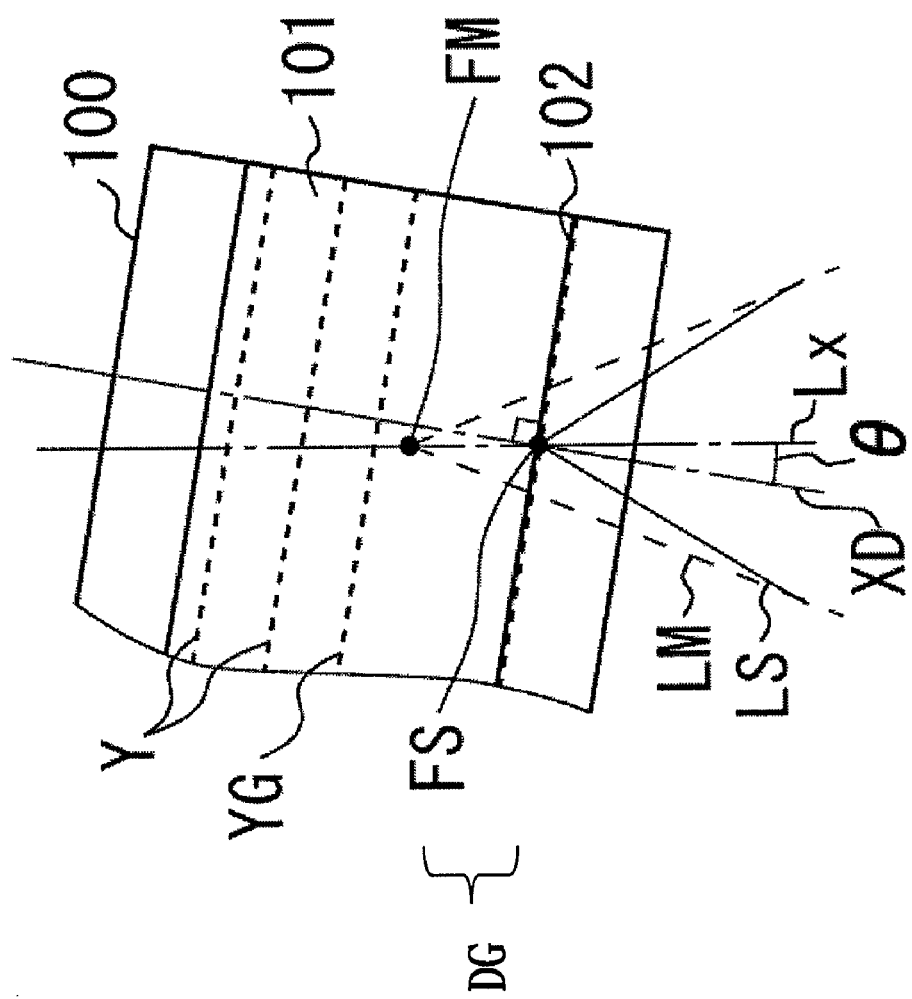
FIG. 10 is a schematic illustration of a displacement of focus position due to a tilt of optical disc.

For instance, when normal XD to the optical disc 100 is tilted by angle θ relative to the optical axis Lx as shown in FIG. 10, the distance between the reference layer 102 and the target mark layer YG is made equal to (1/cos θ) times of the distance DG between the focus FS and the focus FM and hence not equal to the distance DG.

In such a case, if the reference light beam LS is focused to the reference layer 102 of the optical disc 100, the focus FM of the information light beam LM cannot be made to agree with the target mark layer YG. Then, the information of the target mark layer YG cannot be read out.

In other words, when the optical disc 100 is tilted, the optical disc apparatus 20 cannot operate properly for focus control in making the focus FM of the information light beam LM agree with the target mark layer YG to consequently remarkably reduce the accuracy of reproduction of information.

Thus, the optical disc apparatus 20 operates for reference focus control, utilizing the reference layer 102 of the optical disc 100 and gradually switches to information focus control, utilizing the target mark layer YG of the optical disc 100.

(1-4-1) Generation of Focus Error Signal and Tracking Error Signal

The signal processing section 23 computationally determines a focus error signal and a tracking error signal for each of the servo detection signal US and the information detection signals UM that are supplied from the optical pickup 26.

More specifically, the signal processing section 23 computationally determines a focus error signal SFEs according to the servo detection signal US by means of the astigmatism method, using formula (1) shown below and supplies it to the drive control section 22.

$$SFEs=(USa+USc)-(USb+USd) \qquad (1)$$

The focus error signal SFEs represents the quantity of relative displacement of the focus FS of the servo light beam LS (FIG. 4) and the reference layer 102 of the optical disc 100 in the focusing directions.

Additionally, the signal processing section 23 computationally determines a tracking error signal STEs according to the servo detection signal US by means of the push-pull method, using formula (2) shown below and supplies it to the drive control section 22.

$$STEs=(USa+USb)-(USc+USd) \qquad (2)$$

The tracking error signal STEs represents the quantity of relative displacement of the focus FS of the servo light beam LS (FIG. 4) and the target reference track in the reference layer 102 of the optical disc 100 in the tracking directions.

Furthermore, the signal processing section 23 sequentially generates reproduction RF signals SRFs from the target reference trackin the reference layer 102, using formula (3) shown below.

$$SRFs=USa+USb+USc+USd \qquad (3)$$

The reproduction RF signals SRFs contains information on the addresses assigned to the tracks of the reference layer 102.

Still additionally, the signal processing section 23 computationally determines a pull-in signal SPI that represents the sum quantity of light of reflected information light beam LMr according to the information detection signals UM (UMa through UMd), using formula (4) shown below.

$$SPI=UMa+UMb+UMc+UMd \qquad (4)$$

Still additionally, the signal processing section 23 computationally determines a focus error signal SFEm according to the information detection signals UM (UMa through UMd), using formula (5) shown below.

$$SFEm=(UMa+UMc)-(UMb+UMd) \qquad (5)$$

Furthermore, the signal processing section 23 computationally determines a tracking error signal STEm according to the information detection signals UM (UMa through UMd)

by means of the push-pull method, using formula (6) shown below.

$$STEm=(UMa+UMb)-(UMc+UMd) \quad (6)$$

Figure 11:
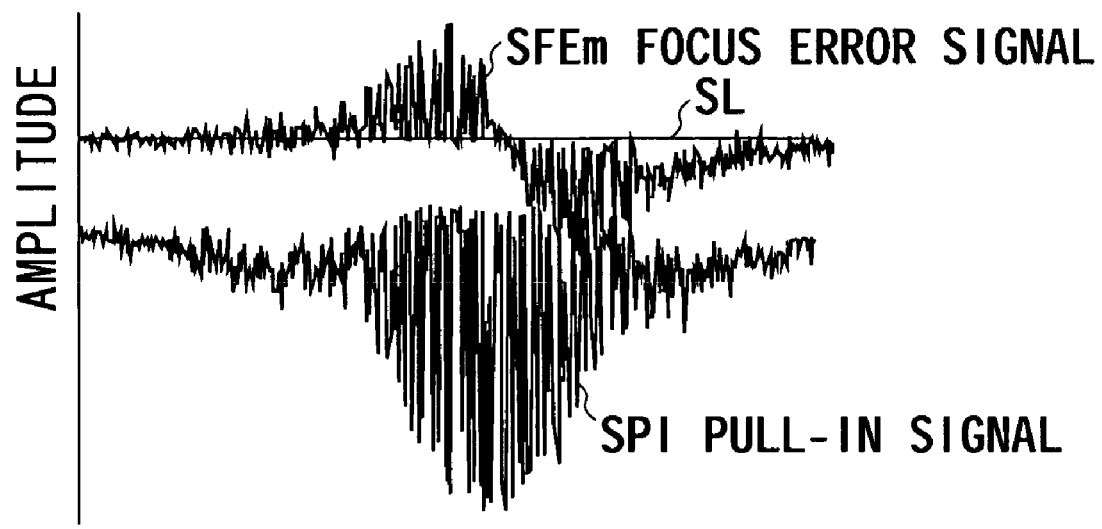
FIG. 11 is a schematic illustration of convergence of a tracking error signal.

The optical disc 100 does not have any signal recording layer unlike known type optical discs and only a recording mark RM that represents information is formed on the target track TRG. Therefore, if there is not any recording mark RM at the target position PG, it is practically not possible to acquire any reflected information light beam LMr. Thus, the signal processing section 23 generates a comb-like pull-in signal SPI and also a comb-like focus error signal SFEm whose signal levels fluctuate according to the presence or absence of a recording mark RM as shown in FIG. 11. The pull-in signal SPI and the focus error signal SFEm show such comb-like shapes probably due to eccentricity of the optical disc 100.

Figure 14:
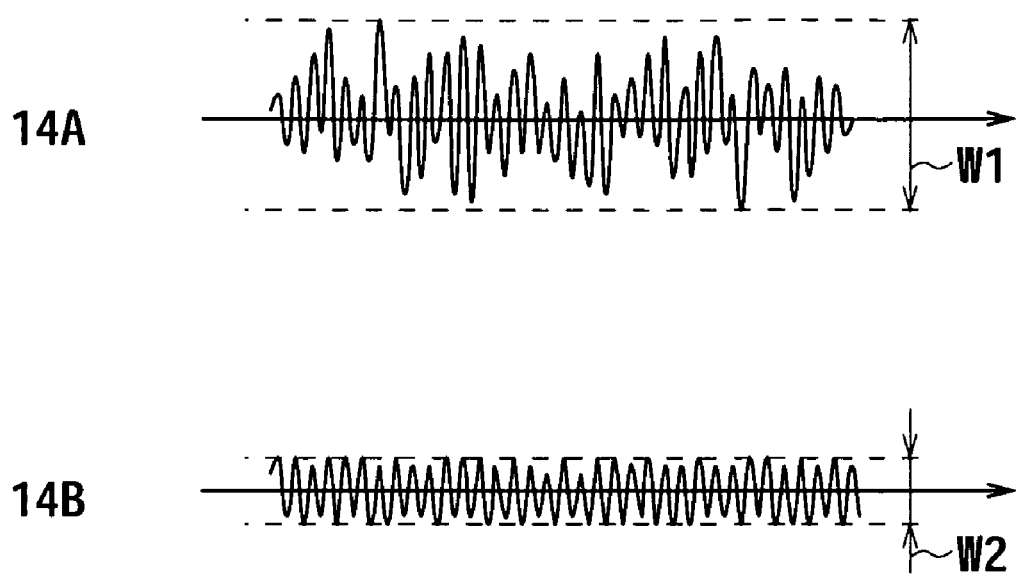
FIGS. 14A and 14B are a schematic illustration of correction of a focus error signal and that of a tracking error signal.

Note that FIG. 11 shows a pull-in signal SPI and a focus error signal SFEm that can be obtained at the time of focus search of moving the objective lens 40 in the focusing directions (so-called S-shaped signals). Also note that the polarity of the pull-in signal SPI in FIG. 11 is opposite to that of FIG. 14. Although not indicated, the span from the starting end to the terminating end of each of the S-shaped signals corresponds to about 0.5 seconds.

Thus, the focus error signal SFEm that is computationally determined by using the formula (5) can represent the quantity of relative displacement of the information light beam LM and the target position PG (or the recording mark RM) when the reflected information light beam LMr has a sufficient quantity of light. On the other hand, the focus error signal SFEm cannot accurately represent the quantity of relative displacement of the information light beam LM and the target position PG when the reflected information light beam LMr is hardly obtained because the signal level is substantially equal to the reference level SL.

Then, the optical disc apparatus 20 detects the presence or absence of a recording mark RM at the target position PG, which is the irradiation line connecting the centers of recording marks RM regardless of presence or absence of such recording marks RM, by irradiating an information light beam LM along the irradiation line.

Then, the optical disc apparatus 20 generates a corrected focus error signal SFEh that represents the quantity of relative displacement of the information light beam LM and the irradiation line by correcting the focus error signal SFEm.

More specifically, referring to FIGS. 12A through 12F, the signal processing section 23 of the optical disc apparatus 20 monitors the pull-in signal SPI (FIG. 12A) and, if the pull-in signal SPI is at a level not lower than the level of predetermined detection threshold AI at time t1, it raises the peak detection signal SPR (FIG. 12B) from level "Low" to level "High". If, on the other hand, the pull-in signal SPI is at a level lower than the level of the detection threshold AI, it lowers the peak detection signal SPR from level "High" to level "Low".

The detection threshold AI is defined typically to be about ⅓ of the signal level of the pull-in signal SPI that can assumingly be obtained when the information light beam LM is focused at a recording mark RM.

The signal processing section 23 monitors the focus error signal SFEm as long as the peak detection signal SPR is at level "High" (FIG. 12C) and detects peak (maximum values) from the focus error signal SFEm. Additionally, the signal processing section 23 connects the maximum values it detects to generate a corrected focus error signal SFEh (FIG. 12D). In other words, the signal processing section 23 generates an envelope that the group of the peaks of the focus error signal SFEm share as tangential lines as the corrected focus error signal SFEh.

The corrected focus error signal SFEh substantially accurately represents any of relative displacement of the focus FM of the information light beam LM (FIG. 2) and the irradiation line of the optical disc 100 in the focusing directions.

Additionally, the signal processing section 23 generates a tracking error signal STEm (FIG. 12E) that is comb-shaped like the focus error signal SFEm. The tracking error signal STEm cannot accurately represent the quantity of relative displacement of the information light beam LM and the irradiation line.

The optical disc apparatus 20 generates a corrected tracking error signal STEh by controlling the tracking error signal STEm as in the case of correcting the focus error signal SFEm.

More specifically, the signal processing section 23 of the optical disc apparatus 20 detects peaks (maximum values and minimum values) from the tracking error signal STEm from time t1 as long as the peak detection signal SPR is at level "High". Additionally, the signal processing section 23 connects the peaks to generate the corrected tracking error signal STEh. In other words, the signal processing section 23 generates an envelope of the tracking error signal STEm as the corrected tracking error signal STEh as in the case of the focus error signal SFEm.

Figure 13:
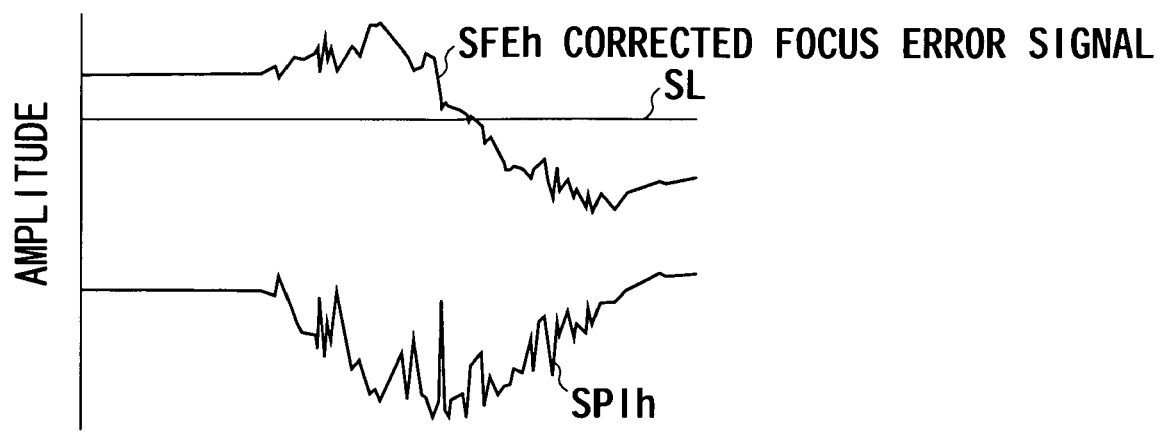
FIG. 13 is a schematic illustration of a focus error signal and a pull in signal.

The tracking error signal STEm represents the quantity of relative displacement of the focus FM of the information light beam LM (FIG. 2) and the irradiation line of the optical disc 100 in the tracking directions. Note that FIG. 13 shows the corrected focus error signal SFEh that is actually generated. However, for the purpose of convenience, FIG. 13 shows a situation where the signal level of the corrected focus error signal SFEh is held to an arbitrarily selected signal level when no peak is detected unlike this embodiment.

In this way, the optical disc apparatus 20 computationally determines the focus error signal SFEs and the tracking error signal STEm according to the servo detection signal US by means of the signal processing section 23 and also computationally determines the corrected focus error signal SFEh and the corrected tracking error signal STEh according to the information detection signals UM.

(1-4-2) Focus Control Utilizing Reference Layer

The optical disc apparatus 20 operates for focus control according to the focus error signal SFEs that is generated according to the servo detection signal US.

More specifically, the drive control section 22 computationally determines synthetic focus error signal SFEC by multiplying the focus error signal SFEs generated according to the servo detection signal US and the corrected focus error signal SFEh generated according to the information detection signals UM respectively by gain G1 and gain G2, using formula (7) shown below.

$$SFEC=G1 \cdot SFEs+G2 \cdot SFEh \quad (7)$$

Note that the gain G1 and the gain G2 take respective values that satisfy the requirements of formula (8) shown below. In other words, the mixing ratio of the focus error signal SFEs and the corrected focus error signal SFEh can be adjusted according to the ratio that corresponds to the gain G1 and the gain G2.

$$G1+G2=1$$

$$0 \leq G1 \leq 1$$

$$0 \leq G2 \leq 1 \quad (8)$$

At this time, the drive control section 22 selects value "1" for the gain G1 and value "0" for the gain G2 in the formula (7) so as to operate for focus control only according to the focus error signal SFEs.

The drive control section 22 generates a focus drive signal SFD by executing a predetermined filtering process and a predetermined amplification process on the synthetic focus error signal SFEC and supplies the focus drive signal SFD to the biaxial actuator 40A of the optical pickup 26. In response, the biaxial actuator 40A drives the objective lens 40 in one of the focusing directions.

At this time, the optical disc apparatus 20 converges the synthetic focus error signal SFEC to value "0" by operating for focus control by way of a feedback process of repeating a series of processes so as to ultimately focus the servo light beam LS to the reference layer 102 of the optical disc 100 (to be referred to as reference focus control hereinafter).

(1-4-3) Tracking Control Utilizing Target Mark Layer

Then, the optical disc apparatus 20 operates for tracking control according to the corrected tracking error signal STEh that is generated according to the information detection signals UM.

It will be appreciated that the optical disc apparatus operates firstly for focus control and then for tracking control because the corrected tracking error signal STEh does not take an appropriate value unless the information light beam LM is focused to the target mark layer YG to a certain extent due to the theoretical principle of computationally determining the corrected tracking error signal STEh.

The drive control section 22 generates a tracking drive signal STD by executing a predetermined filtering process and a predetermined amplification process on the corrected tracking error signal STEh and supplies it to the biaxial actuator 40A of the optical pickup 26. In response, the biaxial actuator 40A drives the objective lens 40 in one of the tracking directions.

At this time, the optical disc apparatus 20 converges the corrected tracking error signal STEh to value "0" by operating for tracking control by way of a feedback process of repeating a series of processes so as to ultimately focus the information light beam LM to the target position PG of the target mark layer YG as in the case of focus control.

(1-4-4) Focus Control Utilizing Target Mark Layer

Meanwhile, the optical disc apparatus 20 adjusts the distance between the focus FS of the servo light beam LS (FIG. 2) and the focus FM of the information light beam LM by controlling the movable lens 58A of the above-described relay lens 58 by means of the control section 21.

The control section 21 holds a relay lens control table showing the defined positions of the movable lens 58A in association with the corresponding respective mark layers Y of the optical disc 100 in a ROM (not shown).

More specifically, the control section 21 reads out the defined position of the movable lens 58A from the relay lens control table according to the mark layer Y that is the target mark layer YG among the mark layers Y of the optical disc 100 so as to control the relay lens 58 to align the movable lens 58A with the defined position.

However, on the optical disc 100, there may be instances where the information light beam LM cannot be focused on the target mark layer YG by controlling the relay lens 58 and focusing the servo light beam LS to the reference layer 102 because of surface run-off or some other reason as described above by referring to FIG. 10.

Thus, the optical disc apparatus 20 can be switched from focus control according to the servo detection signal US to focus control according to the information detection signals UM.

More specifically, the drive control section 22 monitors the corrected tracking error signal STEh and waits until the corrected tracking error signal STEh converges to a certain extent and gets into a state where it is subjected to so-called tracking servo.

More specifically, in a state where the corrected tracking error signal STEh cannot be subjected to tracking control and hence the information light beam LM cannot be made to follow the desired track of the target mark layer YG, it shows a relatively large amplitude w1 as indicated by the waveform in FIG. 14A.

On the other hand, in a state where the corrected tracking error signal STEh can be subjected to tracking control and the information light beam LM can be made to follow the desired track of the target mark layer YG, it shows a relatively small amplitude w2 as indicated by the waveform in FIG. 14B.

Thus, the drive control section 22 compares the amplitude of the corrected tracking error signal STEh with a predetermined threshold and determines that the corrected tracking error signal STEh is subjected to tracking servo when its amplitude falls below the threshold.

At this time, the drive control section 22 gradually reduces the gain G1 and gradually increases the gain G2 within the range of satisfying the requirement of the formula (7) so as to ultimately make the gain G1 and the gain G2 respectively equal to value "0" and value "1" as shown in FIG. 15A.

Then, as a result, the drive control section 22 operates for focus control only according to the corrected focus error signal SFEh after the elapse of time te (to be referred to as information focus control hereinafter). In other words, an optical disc apparatus 20X operates for feedback control so as to make the corrected focus error signal SFEh equal to nil.

Note that, when the focus FM of the information light beam LM is moved away from the target position PG of the target mark layer YG to a large extent and hence in a state of being so-called out of focus servo so that it is difficult to continue the focus control and the tracking control, the drive control section 22 returns to the above-described reference focus control and repeats the above-described series of processes.

The drive control section 22 is so adapted as to detect a state of being out of focus servo when the absolute value of the corrected focus error signal SFEh becomes larger than a predetermined threshold.

In this way, the drive control section 22 operates for reference focus control, utilizing the reference layer 102 of the optical disc 100 and gradually switches to information focus control, utilizing the target mark layer YG of the optical disc 100 when the corrected tracking error signal STEh is converged to a certain extent.

(1-5) Operation and Effect

With the above-described arrangement, the optical disc apparatus 20 converges the information light beam LM that is the light beam emitted from the laser diode 31, which is the light source, by way of the objective lens 40 and irradiates the optical disc 100 where recording marks RM are formed in a uniform recording layer 101 with it.

Then, the optical disc apparatus 20 receives the reflected information light beam LMr that is the light beam returning from a recording mark RM and generates detection signals UMa through UMd. Then, it generates focus error signal SFEm that is a servo control signal representing the relative displacement of the recording mark RM and the focus FM of the information light beam LM from the detection signals UMa through UMd.

Then, the optical disc apparatus 20 generates a corrected focus error signal SFEh that is a corrected servo control signal representing the relative displacement of the irradiation line onto which the information light beam LM is to be applied and the focus FM of the information light beam LM by connecting the peaks of the focus error signal SFEm produced according to recording marks RM.

As a result, the optical disc apparatus 20 can generate a corrected focus error signal SFEh that is similar to focus error signals generated by a known type optical disc apparatus adapted to an optical disc having a signal recording layer. Thus, the optical disc apparatus 20 can execute various processes by using the corrected focus error signal SFEh just like the known type optical disc apparatus.

Additionally, the optical disc apparatus 20 emits a servo light beam LS that is a reference light beam to be applied onto the reference layer 102 of an optical disc 100 where spiral reference tracks TS are formed from the laser diode 51 that is a reference light source.

Then, the optical disc apparatus 20 adjusts the spherical aberration of the information light beam LM that is made to enter the objective lens 40 so as to make the distance between the focus FS of the servo light beam LS converged by the objective lens 40 and the focus FM of the information light beam LM correspond to the target position PG onto which the information light beam LM is to be applied.

When the optical disc apparatus 20 operates for focus control of driving the objective lens 40 to come close to or move it away from the optical disc 100, it firstly operates for reference focus control of focusing the servo light beam LS to the reference layer 102 according to the outcome of receiving the reflected servo light beam LSr that is a reflected reference light beam and subsequently switches to information focus control of focusing the information light beam LM to the mark layer according to the outcome of receiving the reflected information light beam LMr.

Therefore, the optical disc apparatus 20 can ultimately operate for information focus control and hence it can highly accurately focus the focus FM of the information light beam LM to the target mark layer YG.

At this time, the optical disc apparatus 20 operates for reference focus control that can highly probably detect correct values so as to focus the servo light beam LS to the reference layer 102 and switches to information focus control after roughly making the focus FM of the information light beam LM agree with the target mark layer YG.

Therefore, the optical disc apparatus 20 can prevent problems such as incapability of placing the focus FM of the information light beam LM near the target mark layer YG and hence of normally acquiring a focus error signal SFEm that can arise when it operates only for information focus control from the beginning from taking place. Thus, the optical disc apparatus 20 can reliably operate for information focus control.

Additionally, the optical disc apparatus 20 generates a corrected focus error signal SFEm by connecting the peaks of the focus error signal SFEm when the sum quantity of light of detection signals UM is not less than a predetermined threshold AI.

Then, as a result, the optical disc apparatus 20 can select only the peaks when the intensity of the reflected information light beam LMr is higher than a predetermined level to eliminate peaks due to noises so that it is possible to generate a corrected focus error signal SFEh that can express the relative displacement of the information light beam LM and the irradiation line.

Additionally, the optical disc apparatus 20 irradiates the irradiation line with a light beam according to the corrected focus error signal SFEh. Thus, as a result, the optical disc apparatus 20 can operate highly accurately for focus control, using the corrected focus error signal SFEh whose signal level does not change in response to fluctuations of the quantity of light of the reflected information light beam LMr.

With the above-described arrangement, the optical disc apparatus 20 generates a corrected focus error signal SFEh representing the relative displacement of the information light beam LM and the irradiation line by connecting the peaks for the focus error signal SFEm that is computationally determined by means of the astigmatism method, using the formula (5) shown above. Then, as a result, the optical disc apparatus 20 can generate a corrected focus error signal SFEh similar to focus error signals that known type optical disc apparatus generate so that it can operate for focus control by way of control procedures similar to those of known type optical disc apparatus.

(2) Second Embodiment

Figure 16:
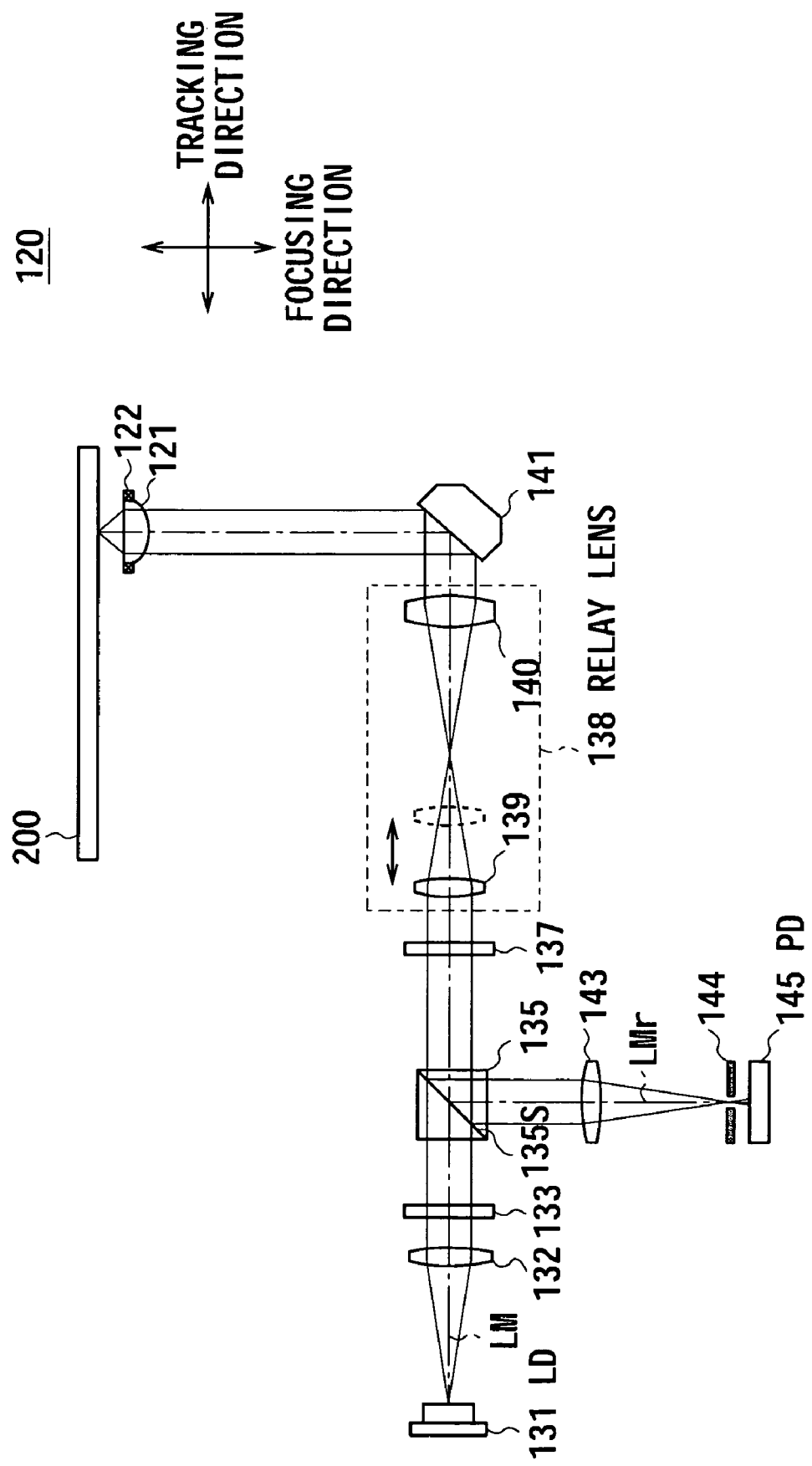
FIG. 16 is a schematic block diagram of the optical pickup according to the second embodiment of the present invention, illustrating the configuration thereof.

FIGS. 16 through 18 schematically illustrate the second embodiment of the present invention, in which the components similar to those of the first embodiment shown in FIGS. 1 through 15 are denoted respectively by the same reference symbols. Although not shown, optical disc 200 that corresponds to the optical disc 100 of the second embodiment does not have any reference layer 102 and is formed by arranging a uniform recording layer 101 between a pair of substrates 103 and 104.

Additionally, the second embodiment differs from the first embodiment in that the configuration of the optical pickup 120 that corresponds to the optical pickup 26 is different from the configuration of the latter and that a corrected focus error signal SFEh and a corrected tracking error signal STEh are employed when pulling in an information light beam LM in the second embodiment. Since the overall configuration of the optical disc apparatus 20X of this embodiment is substantially the same as that of the first embodiment, it will not be described here any further.

(2-1) Configuration of Optical Pickup

Now, the configuration of the optical pickup 120 will be described below. The optical pickup 120 is formed by combining a plurality of optical parts as shown in FIG. 16.

More specifically, laser diode 131 emits an information light beam LM that is a blue laser beam of a wavelength of about 405 nm and makes it enter a collimator lens 132. The laser diode 131 emits an information light beam LM of a predetermined quantity of light that corresponds to the information to be recorded or to be read out under the control of the control section 21 (FIG. 3). Then, the collimator lens 132 converts the information light beam LM from a divergent light beam into a collimated light beam and makes it enter a ½ wave plate 133.

The information light beam LM is adjusted typically so as to become a P-polarized light beam as the direction of polarization thereof is turned by a predetermined angle by the ½ wave plate 133 and then made to enter a polarization beam splitter 135.

The polarization beam splitter 135 transmits the information light beam LM according to the direction of polarization of the light beam and makes it enter a ¼ wave plate 137. The ¼ wave plate 137 converts the information light beam LM from a P-polarized light beam into a circularly polarized light beam and makes it enter a relay lens 138.

The relay lens 138 converts the information light beam LM from a collimated light beam into a convergent light beam by means of a movable lens 139 and then converts the information light beam LM that becomes a divergent light beam after the conversion into a convergent light beam once again by means of a fixed lens 140 before making it enter a mirror 141.

The movable lens 139 is adapted to be moved in the directions of the optical axis of the information light beam LM by an actuator (not shown). More specifically, the relay lens 138 can change the state of convergence of the information light beam LM emitted from the fixed lens 140 by driving the movable lens 139 to move by means of the actuator under the control of the control section 21 (FIG. 2).

The mirror 141 deflects the traveling direction of the information light beam LM by reflecting it and makes it enter an objective lens 121.

The objective lens 121 converges the information light beam LM and irradiates the optical disc 200 with it. The distance from the objective lens 121 to the focus FM of the information light beam LM in the focusing directions is determined by the angle of divergence of the information light beam LM when it is emitted from the relay lens 138.

In an actual operation, the relay lens 138 makes the focus FM roughly agree with the target mark layer YG in the recording layer and adjusts the spherical aberration of the information light beam LM by driving the movable lens 139 under the control of the control section 21.

The objective lens 121 converges the information light beam LM and irradiates the target position PG of the recording layer of the optical disc 200 with it.

When a group of servo information marks KSp or a recording mark RM is formed at or near the target position PG, the recording layer reflects the information light beam LM at the group of servo information marks KSp or the recording mark RM to produce a reflected information light beam LMr.

Then, the reflected information light beam LMr travels to follow the light path of the original information light beam LM in the opposite direction. In other words, the angle of divergence of the reflected information light beam LMr is shifted by the objective lens 121. Then, the reflected information light beam LMr is reflected by the mirror 141 and converted from a divergent light beam into a collimated light beam by the relay lens 138 before it is sequentially transmitted through the ¼ wave plate 137 and the liquid crystal panel 136 and made to enter the polarization beam splitter 135 as an S-polarized light beam.

The polarization beam splitter 135 reflects the reflected information light beam LMr that is an S-polarized light beam by a reflection/transmission plane 135S thereof and makes it enter a condenser lens 143. The condenser lens 143 converges the reflected information light beam LMr and irradiates a photodetector 145 with it by way of a pinhole plate 144.

Since the pinhole plate 144 is arranged so as to place the focus of the reflected information light beam LMr that is converged by the condenser lens 143 in the inside of hole section thereof, the reflected information light beam LMr simply passes therethrough but all stray light LN produced by reflections of light by the surface of the optical disc 200 and some of the mark layers Y other than the mark layer Y located at the target mark layer YG is substantially intercepted by the pinhole plate 144.

Like the photodetector 63 (FIG. 9), the photodetector 145 has four detection regions 145A through 145D (to be collectively referred to as detection regions 145A through 145D hereinafter) for receiving the reflected information light beam LMr.

The photodetector 145 detects parts of the reflected information light beam LMr respectively by means of the detection regions 145A through 145D and generates detection signals UMa, UMb, UMc and UMd that represent the detected quantities of light (to be referred collectively as detection signals UMa through UMd hereinafter), which detection signals are then sent out to the signal processing section 23 (FIG. 3).

(2-2) Pull-In of Information Light Beam

The optical disc apparatus 20X of the second embodiment is adapted to use a corrected focus error signal SFEh and a corrected tracking error signal STEh as described above when pulling in an information light beam LM to a target position PG.

(2-2-1) Focus Pull-In

The optical disc apparatus 20X displaces the objective lens 121 to a position remotest from the optical disc 200 by driving a biaxial actuator 122 and then moves the objective lens 120 so as to come closer to the optical disc 200 at a predetermined moving speed.

At this time, the signal processing section 23 (FIG. 3) of the optical disc apparatus 20X generates an information focus error signal SFEm and an information tracking error signal STEm from the detection signals UMa through UMd as in the case of the first embodiment. Additionally, the signal processing section 23 generates a pull-in signal SPI, a corrected focus error signal SFEh and a corrected tracking error signal STEh from the information focus error signal SFEm and the information tracking error signal STEm as in the case of the first embodiment.

Furthermore, the signal processing section 23 generates a corrected pull-in signal SPIh by correcting the pull-in signal SPI.

More specifically, when the signal level of the pull-in signal SPI becomes not lower than a detection threshold AI, the signal processing section 23 detects peaks (maximum values) of the pull-in signal SPI and generates a corrected pull-in signal SPIh by connecting the maximum values. FIG. 13 shows a corrected pull-in signal SPIh that is actually generated. Note that FIG. 13 shows a situation where the signal level of the corrected pull-in signal SPIh is held to an arbitrarily selected signal level when the peaks are less than the threshold AI. Also note that the polarity of the pull-in signal SPI in FIG. 13 is opposite to that of FIGS. 14A and 14B, FIGS. 17A through 17G and FIGS. 18A through 18D.

As the signal level of the corrected pull-in signal SPIh becomes not lower than a predetermined zero-cross detection threshold AH, the control section 21 detects so-called zero-crosses where the corrected focus error signal SFEh crosses a reference level SL from the corrected focus error signal SFEh. At this time, the control section 21 counts the number of the detected zero-crosses and waits until the corrected focus error signal SFEh zero-crosses at the target mark layer YG.

Additionally, as the corrected focus error signal SFEh zero-crosses at the target mark layer YG, the control section 21 ends the operation of generating the corrected focus error signal SFEh and turns ON the focus loop circuit for executing the focus control operation.

More specifically, the drive control section 22 generates a focus drive signal SFD by multiplying the information focus error signal SFEm by a predetermined gain and supplies the product of multiplication to the biaxial actuator 122. Then, the biaxial actuator 122 operates for focus control so as to make the relative displacement of the irradiation line and the focus FM of the information light beam LM substantially equal to nil by displacing the objective lens 121 according to the focus drive signal SFD.

It will be appreciated that, while the information focus error signal SFEm does not accurately represent the relative displacement of the irradiation line and the focus FM, it substantially accurately represents the polarity (direction) of displacement. Therefore, the optical disc apparatus 20X can appropriately operate for focus control even by using an information focus error signal SFEm by appropriately adjusting the gain and other factors.

Now, the focus pull-in process that is executed when the third mark layer Y from the light receiving side of the optical disc 200 is selected as target mark layer YG will be described by referring to FIG. 17.

As the focus pull-in process is started, the signal processing section 23 starts monitoring the pull-in signal SPI (FIG. 17A). As the signal level of the pull-in signal SPI becomes not lower than predetermined detection threshold AI at time t10, the signal processing section 23 detects peaks from the pull-in signal SPI and the information focus error signal SFEm (FIG. 17D).

The signal processing section 23 keeps on monitoring the pull-in signal SPI thereafter and detects peaks of the pull-in signal SPI and those of the information focus error signal SFEm when the signal level of the pull-in signal SPI becomes not lower than the detection threshold AI. Then, it generates a corrected pull-in signal SPIh (FIG. 17B) and a corrected focus error signal SFEh (FIG. 17E) by connecting the peaks.

As the signal level of the corrected pull-in signal SPIh becomes not lower than the predetermined zero-cross detection threshold AH at time t11, the signal processing section 23 raises the signal level of zero-cross preparation signal SCRf from level "Low" to level "High" and starts monitoring the corrected focus error signal SFEh.

As the signal processing section 23 detects that the signal level of the corrected focus error signal SFEh crosses a reference level (a so-called zero-cross) at time t12, it temporarily raises the signal level of a zero-cross count signal SFZ to level "High" and lowers the signal level of the zero-cross preparation signal SCRf to level "Low".

As the focus FM of the information light beam LM is moved to a position where no recording mark RM exists at time t13 and hence the signal level of the pull-in signal SPI falls below the detection threshold AI, the signal processing section 23 stops generating a corrected pull-in signal SPIh and a corrected focus error signal SFEh but keeps on monitoring the pull-in signal SPI.

As the signal level of the pull-in signal SPI becomes not lower than the predetermined detection threshold AI again at time t14 and remains so until time t17, the signal processing section 23 repeats the process between time t10 and time t13.

As the signal level of the pull-in signal SPI becomes not lower than the predetermined threshold AI at time t18 and time t19, the signal processing section 23 generates a corrected pull-in signal SPIh and a corrected focus error signal SFEh as it does at time t10 and raises the signal level of the zero-cross preparation signal SCRf to level "High" as it does at time t11.

As the signal processing section 23 detects a zero-cross at time t20 as it does at time t12, it temporarily raises the signal level of the zero-cross count signal SFZ to level "High" and lowers the signal loop filter of the zero-cross preparation signal SCRf to level "Low".

At this time, the control section 21 recognizes that the information light beam LM is focused at the target mark layer YG by seeing that the signal level of the zero-cross count signal SFZ is raised to level "High" three times and then raises signal level of a focus loop control signal SFL from level "Low" to level "High". Additionally, the control section 21 turns the focus loop circuit "ON" using the focus loop control signal SFL as trigger. In other words, the optical disc apparatus 20X operates for focus control by means of an information focus error signal SFEm by way of feedback control of reducing the tracking error signal STEm equal to nil.

In this way, the optical disc apparatus 20X counts the mark layers Y by detecting the zero-crosses of the corrected focus error signal SFEh and turns the focus loop circuit from "OFF" to "ON" at the zero-crossing timing of the corrected focus error signal SFEh relative to the target mark layer YG. With this arrangement, the optical disc apparatus 20X can close the focus loop circuit at an appropriate timing and start operating for focus control.

(2-2-2) Tracking Pull-In

Now, the tracking pull-in process that is executed in a state where focus control is started will be described below.

As a focus control operation is started normally, the control section 21 of the optical disc apparatus 20X drives the optical pickup 120 in a radial direction (in one of the tracking directions) of the optical disc 200 according to the reproduction address information applied to it.

Then, referring to FIG. 18, as the control section 21 detects a zero-cross of the corrected tracking error signal STEh at time t25 when the optical pickup 120 is moved close to the track indicated by the reproduction address information, it temporarily raises the signal level of a tracking loop control signal STL and turns the tracking loop circuit from "OFF" to "ON" using the tracking loop control signal STL as trigger.

More specifically, the drive control section 22 generates a tracking drive signal STD by multiplying the tracking error signal STEm by a predetermined gain and supplies the product of multiplication to the biaxial actuator 122. The biaxial actuator 122 operates for tracking control so as to make the relative displacement of the irradiation line and the focus FM of the information light beam LM equal to nil by displacing the objective lens 121 according to the tracking drive signal STD. Thus, as a result, the optical disc apparatus 20X operates for feedback control so as to reduce the tracking error signal STEm equal to nil.

In this way, the optical disc apparatus 20X turns the tracking loop circuit from "OFF" to "ON" at a zero-cross timing of the corrected tracking error signal STEh. As a result, the optical disc apparatus 20X can close the tracking loop circuit and start a tracking control operation at an appropriate timing.

(2-3) Operation and Effect

With the above-described arrangement, the optical disc apparatus 20X operates for focus control of controlling the biaxial actuator 122, which is a drive section, so as to irradiate the irradiation line with an information light beam LM according to focus error signal SFEm and starts the focus control operation in response to a zero-cross timing when corrected focus error signal SFEh crosses a reference level SL.

Thus, the optical disc apparatus 20X can appropriately detect a zero-cross according to a focus error signal SFEm by means of which it is normally difficult to detect a zero-cross because it has a large amplitude that can cross the reference level SL according to fluctuations of the quantity of light of the reflected information light beam LMr. Then, as a result, the optical disc apparatus 20X can appropriately detect the timing for the information light beam LM to be focused on the irradiation line in one of the focusing directions to start a focus control operation.

Additionally, the optical disc apparatus 20X operates for feedback control so as to bring the signal level of the focus error signal SFEm to the reference level SL. Then, as a result, the optical disc apparatus 20X does not need to generate any corrected focus error signal SFEh after ending the pull-in process in one of the focusing directions so that the process load of the signal processing section 23 can be reduced. Additionally, it can minimize the time lag that arises due to the operation of generating a corrected focus error signal SFEh.

Thus, with the above-described arrangement, the optical disc apparatus 20X can start a focus control operation at an appropriate timing because it starts the focus control operation in response to the zero-cross timing of the corrected focus error signal SFEh crossing the reference level SL.

(3) Other Embodiments

The detection threshold AI of the above-described first embodiment is defined typically to be about ⅓ of the signal level of the pull-in signal SPI that can assumingly be obtained when the information light beam LM is focused to a recording mark RM. However, the present invention is by no means limited thereto and alternatively any other appropriate value may be selected for the detection threshold.

Peaks are detected from the focus error signal SFEm and also from the tracking error signal STEm when the pull-in signal SPI becomes not less than the detection threshold AI in the above-described first and second embodiments. However, the present invention is by no means limited thereto and alternatively the in-focus state of the information light beam LM may be determined from the signal level of the pull-in signal SPI.

If such is the case, the signal processing section 23 starts detecting peaks from the focus error signal SFEm when the signal level of the pull-in signal SPI is not less than a predetermined threshold but it determines that the received quantity of light of the reflected information light beam LMr is not sufficient and stops detecting peaks from the focus error signal SFEm when the signal level of the pull-in signal SPI is held less than the predetermined threshold for a predetermined detection period. At this time, the signal processing section 23 can generate a corrected focus error signal SFEh as shown in FIG. 13 by holding the signal level of the corrected focus error signal SFEh and that of the corrected tracking error signal STEh to a predetermined signal level.

A corrected focus error signal SFEh and a corrected tracking error signal STEh are generated by connecting peaks of the focus error signal SFEm and those of the tracking error signal STEm so as to make them appear like envelopes in the above-described first and second embodiments. However, the present invention is by no means limited thereto and alternatively, for example, not the peaks but points located close to the peaks of the focus error signal SFEm and similar points located close to the peaks of the tracking error signal STEm may be connected to generate a corrected focus error signal SFEh and a corrected tracking error signal STEh respectively. Such points may be connected by a smoothly curved line or by broken lines when generating a corrected focus error signal SFEh and when generating a corrected tracking error signal STEh.

A corrected focus error signal SFEh and a corrected tracking error signal STEh are generated respectively by connecting peaks of the focus error signal SFEm and those of the tracking error signal STEm when the signal level of the pull-in signal SPI is not less than a detection threshold AI in the above-described first and second embodiments. However, the present invention is by no means limited thereto and alternatively a corrected focus error signal SFEh and a corrected tracking error signal STEh may be generated respectively by connecting all the peaks of the focus error signal SFEm and those of the tracking error signal STEm.

Still alternatively, a reproduction RF signal SRFm may be used instead of a pull-in signal SPI for the purpose of the present invention. Such a reproduction RF signal can be computationally determined by adding information detection signals UMa through UMd as in the case of a pull-in signal SPI.

A focus error signal SFEm is generated by the astigmatism method in the above-described first and second embodiments. However, the present invention is by no means limited thereto and alternatively, a focus error signal SFEm may be generated by any of various other methods including the spot size method for the purpose of the present invention.

A tracking error signal STEm is generated by the push-pull method in the above-described first and second embodiments. However, the present invention is by no means limited thereto and alternatively, a tracking error signal STEm may be generated by any of various other methods including the differential push-pull (DPP) method and the differential phase detection (DPD) method for the purpose of the present invention.

Both the focus error signal SFEm and the tracking error signal STEm are corrected to generate a corrected focus error signal SFEh and a corrected tracking error signal STEh in the above-described first and second embodiment. However, the present invention is by no means limited thereto and alternatively, only a corrected focus error signal SFEh or a corrected tracking error signal STEh may be generated for the purpose of the present invention.

Reference focus control is gradually switched to information focus control in the above-described first embodiment. However, the present invention is by no means limited thereto and alternatively reference focus control may instantaneously switched to information focus control.

More specifically, the drive control section 22 executes a series of focus control processes as in the case of the first embodiment. As shown in FIG. 15B, the drive control section 22 shifts the gain G1 from value "1" to value "0" and shifts the gain G2 from value "0" to "1" at a time tc. Then, as a result, the drive control section 22 can switch from reference focus control to information focus control in a very short period of time.

The distance between the focus LS of the servo light beam LS and the focus FM of the information light beam LM is adjusted by means of the relay lens 58 of the optical pickup 26 in the above-described first embodiment. However, the present invention is by no means limited thereto and alternatively a different optical element selected from various optical elements may be used. What is essential here is to move the focus FM produced by the objective lens 40 by modifying the spherical aberration of the information light beam LM by means of the information optical system 50 of the optical pickup 26. Additionally, not only the spherical aberration of the information light beam LM but also that of the servo light beam LS may be adjusted.

The spherical aberration of the information light beam LM is corrected by means of the relay lens 138 of the optical pickup of the above-described second embodiment. However, the present invention is by no means limited thereto and alternatively the spherical aberration of an information light beam LM may be corrected by any of various other methods for the purpose of the present invention. Furthermore, such a spherical aberration correcting means may not necessarily be indispensable.

A recording mark RM that is a bubble is formed as a three-dimensional recording mark in the recording layer 101 and also in the recording layer of the above-described first and second embodiments, whichever appropriate. However, the present invention is by no means limited thereto and alternatively a three-dimensional recording mark can be formed by destroying a hologram formed in advance in the recording layer 101 or the recording layer 201 for the purpose of the present invention.

A hologram can be formed as a three-dimensional recording mark by splitting a single light beam emitted from a single light source into two light beams and irradiating them from opposite directions. The configuration of an optical disc apparatus adapted to record a hologram as a recording mark is described in Patent Document 1.

A plurality of mark layers Y are formed in the recording layer 101 and also in the recording layer of the above-described first and second embodiments. However, the present invention is by no means limited thereto and alternatively a single mark layer may be formed for the purpose of the present invention.

The reference layer 102 has a spiral reference tracks TS in the above-described first embodiment. However, the present invention is by no means limited thereto and alternatively the reference layer 102 may have concentric reference tracks for the purpose of the present invention.

The above-described second embodiment is adapted to operate for feedback control so as to bring the signal level of the focus error signal SFEm and that of the tracking error signal STEm to the reference level SL. However, the present invention is by no means limited thereto and alternatively an optical disc apparatus according to the second embodiment of the present invention may be adapted to operate for feedback control so as to bring the signal level of a corrected focus error signal SFEh and that of a corrected tracking error signal STEh to the reference level SL. Still alternatively, the two types of feedback control may appropriately be combined.

The optical disc apparatus 20 of the above-described first embodiment is made to include an objective lens, which is objective lens 40, a signal processing section 23 operating both as a servo control signal generation section and a servo signal correction section. However, the present invention is by no means limited thereto and an optical disc apparatus may alternatively be made to include an objective lens, a servo control signal generation section and a servo signal correction section having configurations different from those described above for the purpose of the present invention.

The optical disc apparatus 20X of the above-described second embodiment is made to include an objective lens, which is objective lens 121, a signal processing section 23 operating both as a servo control signal generation section and a servo signal correction section. However, the present invention is by no means limited thereto and an optical disc apparatus may alternatively be made to include an objective lens, a servo control signal generation section and a servo signal correction section having configurations different from those described above for the purpose of the present invention.

The present invention can find applications in the field of optical disc apparatus for recording images and/or sounds or computer data on an optical disc and reproducing such information from an optical disc.

The present application contains subject matter related to that disclosed in Japanese Priority Patent Application JP 2008-143351 filed in the Japan Patent Office on May 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
an optical disc;
an objective lens that converges a light beam emitted from a light source and irradiates the optical disc having recording marks formed as bubbles in a uniform recording layer with the light beam, the bubbles being formed between upper and lower portions of the uniform recording layer, the upper portion of the uniform recording layer being closer to a first side of the optical disc than the bubbles, the lower portion of the uniform recording layer being farther from the first side than the bubbles, the first side of the optical disc being a side upon which the light beam is incident on the optical disc from the objective lens;
a detection signal generation section that receives a return light beam reflected from the recording marks and generates a detection signal;
a servo control signal generation section that generates a servo control signal representing relative displacement between the recording marks and a focus of the light beam at least partially based on the detection signal; and
a servo signal correction section that generates a correction servo control signal by connecting peaks of the servo control signal, the peaks being produced according to the recording marks.

2. The optical disc apparatus according to claim 1, comprising:
a reference light source that emits a reference light beam for irradiating a reference layer formed in the optical disc and having concentric or spiral reference tracks formed therein;
a drive section that drives the objective lens;
a spherical aberration adjustment section that adjusts spherical aberration of at least either the reference light beam or the light beam made to enter the objective lens so as to extend a distance between a focus of the reference light beam and the focus of the light beam converged by the objective lens in the direction of an optical axis of the light beam by a distance corresponding to a target position to be irradiated with the light beam; and
a focus control section for operating for focus control of driving the objective lens to come closer to or move away from the optical disc; wherein
the focus control section operates firstly for reference focus control of focusing the reference light beam to the reference layer according to an outcome of reception of the reflected reference light beam reflected by the reference layer and subsequently switching to information focus control of focusing the light beam to a mark layer according to an outcome of reception of the reflected light beam.

3. The optical disc apparatus according to claim 1, wherein the servo signal correction section generates the correction servo control signal by connecting the peaks of the servo control signal when a sum quantity of light derived from the detection signal is not less than a predetermined detection threshold.

4. The optical disc apparatus according to claim 1, comprising:
- a drive section that drives the objective lens; and
- a drive control section that controls the drive section so as to apply the light beam onto an irradiation line to be irradiated with the light beam according to the correction servo control signal.

5. The optical disc apparatus according to claim 1, comprising:
- a drive section that drives the objective lens; and
- a drive control section that operates for servo control of controlling the drive section so as to apply the light beam onto an irradiation line to be irradiated with the light beam according to the servo control signal and starts the servo control in response to a zero-cross timing when the correction servo control signal crosses a reference level.

6. The optical disc apparatus according to claim 5, wherein the drive control section operates for feedback control so as to bring a signal level of the servo control signal to the reference level.

7. The optical disc apparatus according to claim 5, wherein the drive control section operates for feedback control so as to bring a signal level of the correction servo control signal to the reference level.

8. The optical disc apparatus according to claim 1, wherein the servo signal correction section generates an envelope connecting the peaks as the correction servo control signal.

9. The optical disc apparatus according to claim 1, wherein the servo control signal is a focus error signal.

10. The optical disc apparatus according to claim 1, wherein the servo control signal is a tracking error signal.

11. A correction servo control signal generation method comprising:
- a step of receiving an optical disc;
- a servo control signal generation step of generating a servo control signal representing relative displacement between recording marks and a focus of a light beam from a detection signal produced according to a quantity of a return light beam from the optical disc having the recording marks formed as bubbles in a uniform recording layer between upper and lower portions of the uniform recording layer, the upper portion of the uniform recording layer being closer to a first side of the optical disc than the bubbles, the lower portion of the uniform recording layer being farther from the first side than the bubbles, the first side of the optical disc being a side upon which the light beam is incident on the optical disc; and
- a servo signal correction step of generating a correction servo control signal by connecting peaks of servo control signals, the peaks being produced according to the recording marks.

* * * * *